United States Patent
Honjo

(10) Patent No.: US 8,068,141 B2
(45) Date of Patent: Nov. 29, 2011

(54) IMAGING DEVICE

(75) Inventor: Kenichi Honjo, Osaka (JP)

(73) Assignee: Panasonic Corporation, Osaka (JP)

( * ) Notice: Subject to any disclaimer, the term of this patent is extended or adjusted under 35 U.S.C. 154(b) by 667 days.

(21) Appl. No.: 11/997,826

(22) PCT Filed: Jul. 27, 2006

(86) PCT No.: PCT/JP2006/314876
§ 371 (c)(1),
(2), (4) Date: Feb. 4, 2008

(87) PCT Pub. No.: WO2007/015417
PCT Pub. Date: Feb. 8, 2007

(65) Prior Publication Data
US 2009/0225176 A1    Sep. 10, 2009

(30) Foreign Application Priority Data
Aug. 4, 2005   (JP) ................. 2005-226508

(51) Int. Cl.
*H04N 5/228*    (2006.01)
(52) U.S. Cl. ............. 348/208.5; 348/208.99; 348/208.2; 348/208.4; 348/208.6; 348/208.7; 348/208.11
(58) Field of Classification Search ............... 348/208.5
See application file for complete search history.

(56) References Cited

U.S. PATENT DOCUMENTS

| | | | | |
|---|---|---|---|---|
| 5,657,080 A | * | 8/1997 | Sekine ................. | 348/208.5 |
| 5,959,666 A | | 9/1999 | Naganuma | |
| 7,385,632 B2 | * | 6/2008 | Shinohara et al. ....... | 348/208.5 |
| 7,711,253 B2 | * | 5/2010 | Tomita et al. ........... | 396/53 |
| 2001/0022619 A1 | | 9/2001 | Nishiwaki | |
| 2006/0216009 A1 | * | 9/2006 | Kawamura ............... | 396/55 |

FOREIGN PATENT DOCUMENTS

| | | |
|---|---|---|
| JP | 05-224270 | 9/1993 |
| JP | 08-331430 | 12/1996 |
| JP | 2000-069351 | 3/2000 |
| JP | 2001-100264 | 4/2001 |
| JP | 2001-203930 | 7/2001 |
| JP | 2002-131799 | 5/2002 |
| JP | 2004-312777 | 11/2004 |

OTHER PUBLICATIONS

Japanese Office Action issued in Japanese Patent Application No. JP 2007-529230 dated Jun. 30, 2011.

* cited by examiner

*Primary Examiner* — Anthony J Daniels
(74) *Attorney, Agent, or Firm* — McDermott Will & Emery LLP

(57) ABSTRACT

An imaging device ICD, which realizes an image blurring compensation function which achieves image blurring compensation during a framing period and image blurring compensation during releasing, is provided. In the imaging device (ICD), an OIS unit control section (104) compensates image blurring occurring in an optical image by moving an optical axis of an imaging optical system (100), and compensates the image blurring by changing a position of cutout of image data outputted from an image sensor (106). An image shift amount calculation section (39x, 39y) detects image blurring information. A system controller (120) causes the OIS unit control section (104) to mainly move the optical axis during an exposure period based on the detected image blurring information, and to mainly change the position of the cutout of the image data during a period other than the exposure period, thereby compensating image blurring which occurs in a taken image.

9 Claims, 16 Drawing Sheets

IMAGING DEVICE

RELATED APPLICATIONS

This application is the U.S. National Phase under 35 U.S.C. §371 of International Application No. PCT/JP2006/314876, filed on Jul. 27, 2006, which in turn claims the benefit of Japanese Application No. 2005-226508, filed on Aug. 4, 2005 the disclosure of which Applications are incorporated by reference herein.

TECHNICAL FIELD

The present invention relates to an imaging device which includes an imaging optical system having image blurring compensation means for compensating the image blurring.

BACKGROUND ART

Recently, downsizing and weight saving of devices have been developed while imaging devices such as a digital still camera, a video movie, and the like have been popularized. Further, a demand for image blurring compensation has been increased in accordance with enhancement of an image quality of the imaging device.

An imaging device (Patent Document 1) having conventionally known image blurring compensation means includes vibration detection means which detects vibration of a camera due to image blurring, arithmetic means which calculates an appropriate compensation amount for the image blurring, an image blurring compensation lens, lens drive means which drives the image blurring compensation lens, and compensation mode selection means for selecting one of a constant compensation mode and a release compensation mode in which blurring compensation is performed only during releasing. In the imaging device, when the constant compensation mode is selected, compensation by the lens drive means is started after start of vibration detection operation by the vibration detection means. When the release compensation mode is selected by the compensation mode selection means, compensation by the lens drive means is performed only during releasing.

In the above imaging device, the constant compensation mode in which image blurring compensation is constantly performed after a release button is pressed halfway, and the release compensation mode in which image blurring compensation is performed only during releasing are provided as modes of image blurring compensation. Thus, it is intended that in the case where a state of the release button being pressed halfway continues for a prolonged period of time, the release compensation mode is selected to reduce useless consumption of a battery which is consumed by a motor, and the like, and in the case where an effect of the image blurring compensation is desired to be confirmed beforehand, the constant compensation mode is selected to confirm the effect of the image blurring compensation.

Also, it is intended that when the release compensation mode is selected, a moveable amount of a compensation optical system between a center position at which an optical axis is located and a limit position is ensured by setting the compensation optical system at the center position, whereby a function of the image blurring compensation of the release compensation mode can be effectively used.

[Patent Document 1] Japanese Laid-Open Patent Publication No. 5-224270

DISCLOSURE OF THE INVENTION

Problems to be Solved by the Invention

With respect to the image compensation function, the imaging device disclosed in the above Patent Document 1 is configured to select one of the constant compensation mode and the release compensation mode in which blurring compensation is performed only during releasing. In the constant compensation mode, image blurring does not occur during a period when a user performs framing while watching a monitor screen. However, because the compensation optical system cannot be set at the center position at the time of start of releasing, if the compensation optical system has moved away from the center position at which the optical axis is located and is located around the limit position at the time of start of releasing in this mode, the image blurring compensation may not work. On the other hand, in the release compensation mode, because the image blurring compensation is performed only during releasing, image blurring occurs during the period when the user performs framing while watching a monitor screen. Therefore, in either mode, it is hard to achieve both of the image blurring compensation during a framing period and the image blurring compensation during releasing.

In view of the above problems, an object of the present invention is to provide an imaging device operable to perform image blurring compensation during a period when a user performs framing while watching a monitor screen, and to perform image blurring compensation in a state in which a margin for a movable amount of a compensation optical system is ensured even during releasing, thereby realizing an image blurring compensation which achieves both of image blurring compensation during a framing period and high accurate image blurring compensation during releasing.

Solution to the Problems

An imaging device for outputting an electric image signal of an object comprises:

an imaging optical system for forming an optical image of the object by using a plurality of lens units;

an image sensor for taking and converting the optical image of the object into an electric image signal;

an oscillation detection section for detecting movement information of the imaging device;

an optical image blurring compensation section for compensating image blurring occurring in the optical image by moving an optical axis of the imaging optical system;

an electronic image blurring compensation section for compensating the image blurring by changing a cutout position of image data outputted from the image sensor;

an image processing section for displaying and storing the image signal obtained by exposing the image sensor; and an image blurring control section for operating mainly the optical image blurring compensation section during an exposure period of the imaging device, and for operating mainly the electronic image blurring compensation section during a period other than the exposure period in accordance with the movement information outputted from the oscillation detection section.

EFFECT OF THE INVENTION

According to the present invention, an imaging device can be provided, which realizes an image blurring compensation which achieves image blurring compensation during a fram-

DESCRIPTION OF THE REFERENCE CHARACTERS

Figure 1:
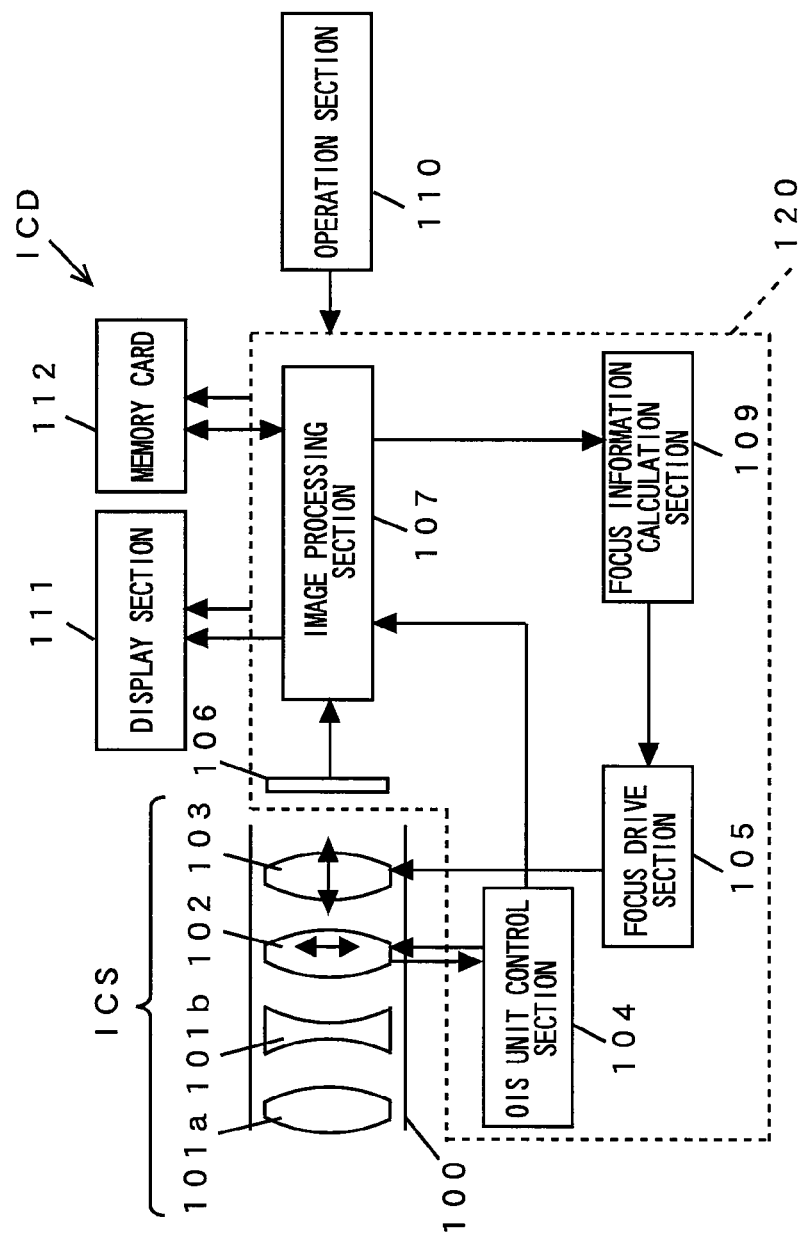
FIG. 1 is a block diagram showing a structure of an imaging device according to an embodiment 1 of the present invention.

ICD imaging device
ICS imaging optical system
1 image blurring compensation lens
2 pitching moving frame
2a main body of pitching moving frame
3a shaft
3b guide member
4 yawing moving frame
4a shaft
4b guide groove
5 fixed frame
6 multilayer substrate
6a, 6b positioning hole
6e, 6f land
7A, 7B coil pattern
8A, 8B hall element
9 flexible printed wiring board
9a fixed portion
9b movable portion
9c terminal portion
9d connection wiring pattern
10A, 10B magnet
11A, 11B yoke
12a, 12b positioning projection
13a, 13b, 14a, 14b land
15 connector for signal transmission/reception
17 QVGA image data arrangement frame
31x, 32y OIS actuator
32x, 33y position detection sensor
33x, 33y gain compensation section
34x, 34y angular velocity sensor
35x, 35y integrator
36x, 36y gain compensation section
37x, 37y comparison section
38x, 38y OIS unit drive section
39x, 39y image shift amount calculation section
40x, 40y target instruction control section
41 image reading section
42 image cutout section
43 image memory
100 lens barrel
101 zoom lens system
101a first zoom lens unit
101b second zoom lens unit
102 OIS unit
103 focus lens unit
104 OIS unit control section
105 focus drive section
106 CCD
107 image processing section
109 focus information calculation section
110 operation section
111 display section
112 memory card
120 system controller

BEST MODE FOR CARRYING OUT THE INVENTION

Embodiment 1

With reference to FIG. 1, a structure of an imaging device according to an embodiment 1 of the present invention will be described. An imaging device ICD includes a lens barrel 100, an OIS unit control section 104, a focus drive section 105, a CCD 106 as an image sensor, an image processing section 107, a focus information calculation section 109, an operation section 110, a display section 111, and a memory card 112. OIS is an abbreviated name which takes initial letters of Optical Image Stabilizer. The OIS unit control section 104, the focus drive section 105, the image processing section 107, and the focus information calculation section 109 constitute a system controller 120 which controls an operation of the entire imaging device ICD.

The lens barrel 100 holds therein a zoom lens system 101 as an imaging optical system, a lens unit 102 for image blurring compensation (hereinafter, referred to as "OIS unit 102"), and a focus lens unit 103. The zoom lens system 101, the OIS unit 102, and the focus lens unit 103 constitute an imaging optical system ICS which forms an optical image of an object with variable magnification. The imaging optical system is composed of, in order from the object side, a first zoom lens unit 101a and a second zoom lens unit 101b which move along an optical axis when zooming is performed, the OIS unit 102 which moves vertically with respect to the optical axis for performing image blurring compensation, and the focus lens unit 103 which moves along the optical axis for adjustment to a focused state.

The focus drive section 105 outputs position information to the focus information calculation section 109 when the focus lens unit 103 is driven. In addition, the focus drive section 105 functions to output, based on an instruction outputted from the system controller 120, a drive signal for driving the focus lens unit 103 in the direction of the optical axis. Further, the focus drive section 105 may function to drive the zoom lens system 101 in the direction of the optical axis in accordance with a user's operation of a zoom lever (not shown).

The CCD 106 is an image sensor which takes an optical image formed by the imaging optical system ICS at a predetermined timing, converts the optical image into an electric image signal and outputs the electric image signal. The image processing section 107 is a processing section which performs predetermined image processing such as white balance adjustment, γ correction, and the like on the image signal outputted from the CCD 106.

The display section 111 is typically a liquid crystal display. The display section 111 receives the image signal outputted from the CCD 106 is inputted through the image processing section 107 according to an instruction outputted from the system controller 120 and displays the taken image as a visible image to the user based on the image signal. The image processing section 107 is bi-directionally accessible to the memory card 112 which is detachable by the user. The memory card 112 receives and stores the image signal outputted from the CCD 106 through the image processing section 107 based on an instruction outputted from the system controller 120. Further, the image signal stored in the memory card 112 is supplied to the display section 111 through the image processing section 107.

The operation section 110 is provided outside a main body of the imaging device ICD, and is means used by the user for operating the imaging device ICD. The operation section 110 includes a power switch, a shutter button, and the like.

The following will describe an operation of the focus drive section 105. When the shutter button of the operation section 110 is pressed halfway, the system controller 120 detects a state of the shutter button of the operation section 110 being pressed halfway, and causes the image processing section 107 to transfer the image signal generated by the CCD 106 to the focus information calculation section 109.

The focus information calculation section 109 calculates a defocus amount based on contrast information included in the transferred image signal and the position information of the focus lens unit 103 outputted from the focus drive section 105. Then, the focus information calculation section 109 generates a control signal for controlling the position of the focus lens unit 103, and outputs the control signal to the focus drive section 105.

Figure 3:
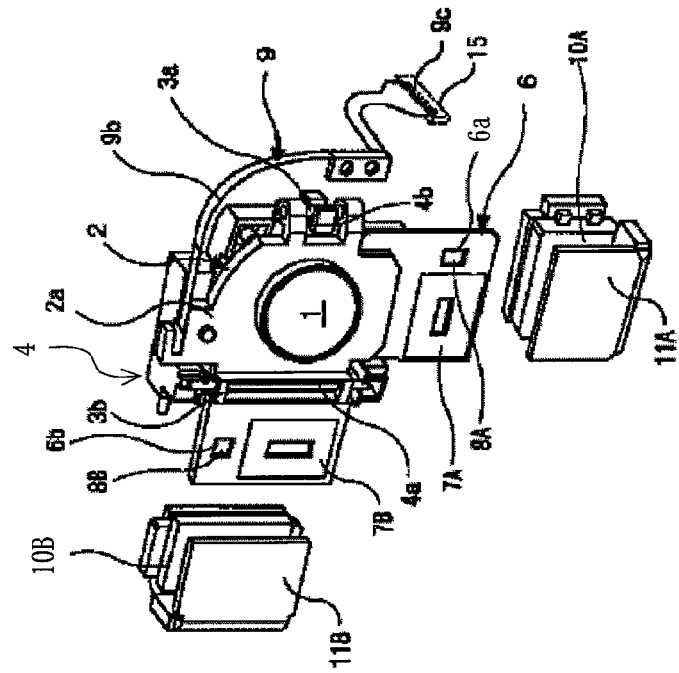
FIG. 3 is an exploded perspective view showing a structure of a principal part of the OIS unit of FIG. 2.
Figure 2:
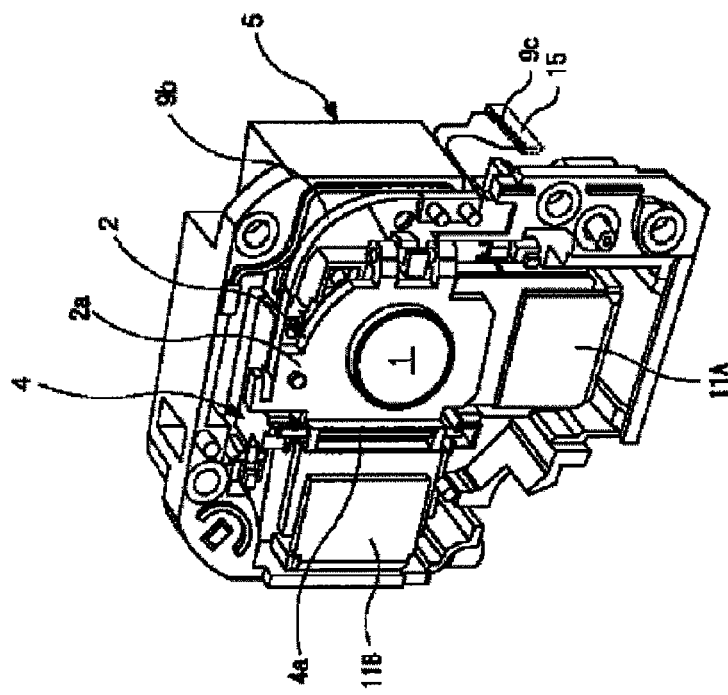
FIG. 2 is a perspective view showing an external view of an OIS unit of the imaging device of FIG. 1.
Figure 4:
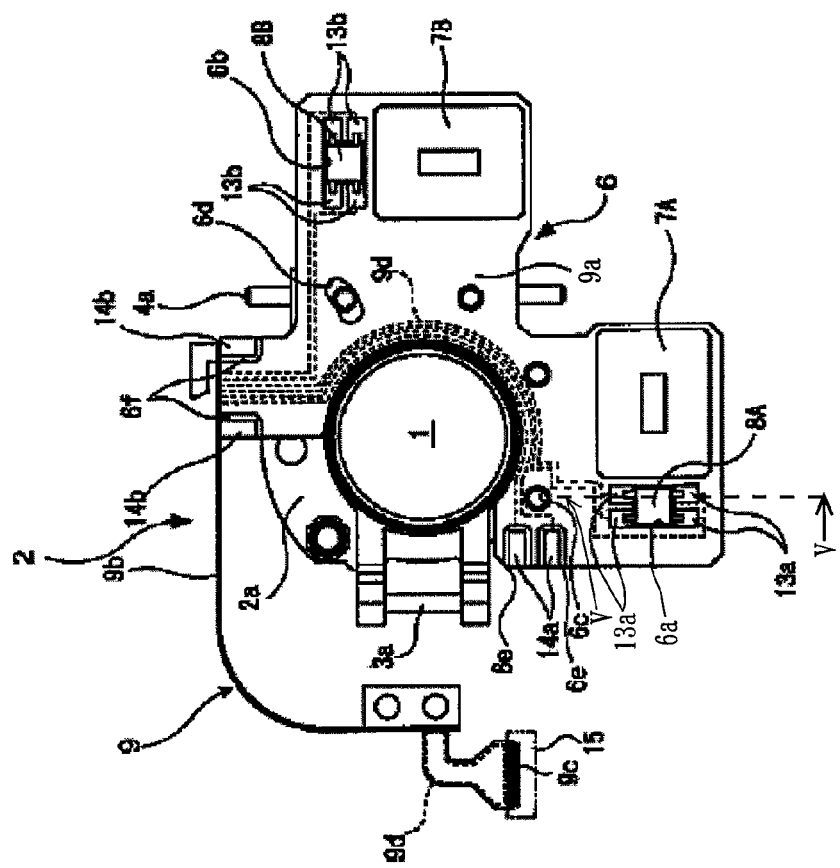
FIG. 4 is a view showing a pitching moving frame of the imaging device of FIG. 1.
Figure 5:
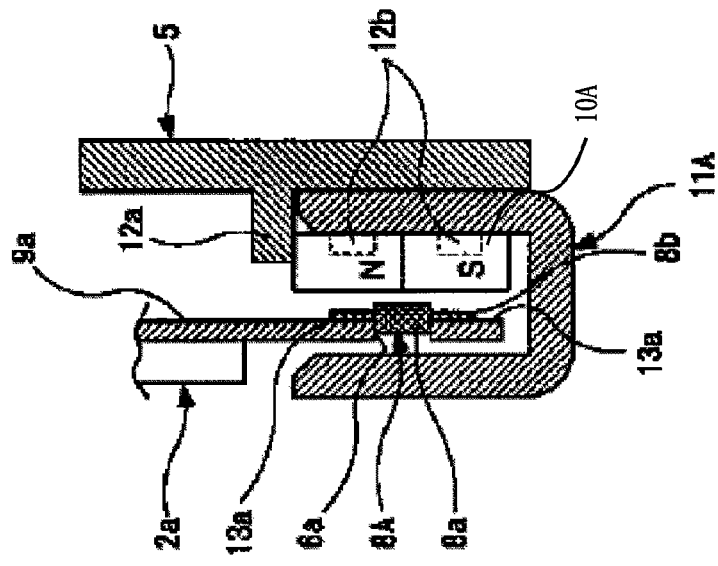
FIG. 5 is a view showing a cross section along the V-V line in FIG. 4.

With reference to FIG. 2, FIG. 3, FIG. 4, and FIG. 5, the following will describe in detail the OIS unit 102. Specifically, FIG. 2 shows the OIS unit 102 in an assembled state as seen obliquely from above, FIG. 3 shows a principal part of the OIS unit 102 in an assembled state, FIG. 4 shows a back face of a pitching moving frame, and FIG. 5 shows the V-V cross section in FIG. 4.

As shown in FIG. 2, a yawing moving frame 4 is supported by a fixed frame 5 via a shaft (not shown) extending in a left-right direction so as to be moveable in the left-right direction. A shaft 4a and a guide groove 4b which are extended in an up-down direction are provided to the yawing moving frame 4.

As shown in FIG. 3, a guide member 3b which is slidably coupled to the shaft 4a and a shaft 3a which is slidably coupled to the guide groove 4b are provided to a main body 2a of a pitching moving frame 2. By them, the pitching moving frame (moving frame) 2 which holds an image blurring compensation lens 1 of the OIS unit 102 (the OIS unit 102) is held by the yawing moving frame 4 so as to be moveable in the up-down direction. Therefore, the image blurring compensation lens 1 (the OIS unit 102) is supported via the pitching moving frame 2 and the yawing moving frame 4 so as to be moveable with respect to the fixed frame 5 shown in FIG. 2 in the left-right direction and the up-down direction.

To the main body 2a of the pitching moving frame 2, a multilayer substrate 6 having plural layers (for example, four layers) in which a pitching coil pattern 7A and a yawing coil pattern 7B for driving the image blurring compensation lens 1 (the OIS unit 102) are formed is mounted. Hall elements (magnetic sensors) 8A and 8B as a position detection sensor for detecting the position of the image blurring compensation lens 1 (the OIS unit 102) are mounted to the multilayer substrate 6.

For highly accurately positioning the hall elements 8A and 8B, the hall elements 8A and 8B are fitted in positioning holes 6a and 6b which are formed by stamping with a die concurrently with formation of reference holes 6c and 6d of the multilayer substrate 6. The positioning holes 6a and 6b are formed slightly smaller than the outer shape of the hall element so that the hall elements 8A and 8B (FIG. 3) can be lightly press-fitted therein. Then, the hall elements 8A and 8B are lightly press-fitted into the positioning holes 6a and 6b, respectively, so that the hall elements 8A and 8B are located highly accurately in the positioning holes 6a and 6b without moving therein.

As shown in FIG. 4, a flexible printed wiring board 9 including a connection wiring pattern 9d formed therein is provided to the multilayer substrate 6. The flexible printed wiring board 9 is composed of a fixed portion 9a, a movable portion 9b, and a terminal portion 9c. The fixed portion 9a is mounted to the back face of the multilayer substrate 6, the movable portion 9b extends from the fixed portion 9a and is connected to the fixed frame 5 (see FIG. 3 and FIG. 5), and the terminal portion 9c is mounted to the end of the movable portion 9b, so that these portions are used for power supply and signal transmission/reception of the fixed frame 5 side.

In addition, lands 13a and 13b for sensors are provided on parts of the fixed portion 9a of the flexible printed wiring board 9 in the vicinity of the positioning holes 6a and 6b, respectively. By fitting the hall elements 8A and 8B in the positioning holes 6a and 6b, respectively, terminals 8b (see FIG. 5) of the hall elements 8A and 8B are brought into contact with the lands 13a and 13b for sensors. As a result, the hall elements 8A and 8B do not need to be press-supported in soldering, and work operation is easy, thereby providing excellent productivity.

Further, lands 6e and 6f which are connected to the pitching coil pattern 7A and the yawing coil pattern 7B, respectively, are formed on the multilayer substrate 6. The lands 6e and 6f are connected by solder to corresponding lands 14a and 14b which are formed on the fixed portion 9a of the flexible printed wiring board 9. The lands 6e and 6f are also connected to a connector 15 via the connection wiring pattern 9d which is formed on the fixed portion 9a, the movable portion 9b of the flexible printed wiring board 9, and the terminal portion 9c. As a result, transmission/reception of electric signals with respect to the hall elements 8A and 8B and power supply to the coil patterns 7A and 7B are performed between the connector 15 on the fixed frame 5 (see FIG. 2) and the yawing moving frame 4 (see FIG. 2).

As shown in FIG. 5, in the fixed frame 5, magnets 10A and 10B (see FIG. 3) which face the coil patterns 7A and 7B are mounted to yokes 11A and 11B. In order to perform accurate positioning such that center positions of movement ranges of the hall elements 8A and 8B correspond to boundaries of the magnets 10A and 10B each of which is polarized into two poles, a positioning projection (a positioning portion) 12a which is in contact with at least one of upper and lower positions of the magnets 10A and 10B and a positioning projection 12b (a positioning portion) which is in contact with at least one of left and right positions of the magnets 10A and 10B are provided in the fixed frame 5. The position of the magnets 10A and 10B are regulated by being in contact with the positioning projections 12a and 12b.

The following will describe a function of the OIS unit control section 104. The OIS unit control section 104 according to the present embodiment has a monitor image blurring compensation function and a shooting image blurring compensation function. The monitor image blurring compensation function is a function of compensating image blurring during a framing period. The shooting image blurring compensation function is a function of compensating image blurring during a release period (hereinafter, "exposure"). In this example, the monitor image blurring compensation function is an electronic image blurring compensation function of compensating image blurring by changing a cutout position of the image signal outputted from the CCD. The shooting image blurring compensation function is an optical image blurring compensation function of compensating image blurring by controlling movement of the OIS unit 102. The electronic image blurring compensation function is operated during the framing period prior to exposure, the optical image blurring compensation function is operated during the exposure period.

As conditions for the OIS unit control section 104 to operate, three ways, namely, a case 1, a case 2, and a case 3 which will be described bellow are mainly considered.

<Case 1>

When the shutter button of the operation section 110 is pressed halfway, the system controller 120 detects a state of the shutter button being pressed halfway and sets the OIS unit control section 104 to a monitor image blurring compensation mode. When the shutter button is pressed fully, the system controller 120 detects a state of the shutter button being pressed fully and changes the OIS unit control section 104 from the monitor image blurring compensation mode to a shooting image blurring compensation mode. Further, after causing the CCD 106 to output an image signal and storing the image signal in the memory card via the image processing section 107, the system controller 120 terminates the operation of the OIS unit control section 104.

<Case 2>

When the shutter button of the operation section 110 is pressed fully, the system controller 120 detects this fully pressed state and sets the OIS unit control section 104 to the shooting image blurring compensation mode right before the image signal is outputted from the CCD 106. After the image signal is outputted from the CCD 106, the system controller 120 stores the image signal in the memory card via the image processing section 107, and then terminates the shooting image blurring compensation mode of the OIS unit control section 104.

<Case 3>

When the power switch of the operation section 110 is turned ON and the imaging device ICD is at a shooting mode, the system controller 120 detects that the imaging device ICD is at the shooting mode and sets the OIS unit control section 104 to the monitor image blurring compensation mode. When the power switch is turned OFF, or when the device is not at the shooting mode such as when the image signal stored in the memory card 112 is supplied to the display section 111 through the image processing section 107 and displayed as an image on the display section 111, the system controller 120 terminates the monitor image blurring compensation mode of the OIS unit control section 104.

In the case where the shutter button of the operation section 110 is pressed fully when the imaging device ICD is at the shooting mode, the system controller 120 sets the OIS unit control section 104 to the shooting image blurring compensation mode right before the image signal is outputted from the CCD 106. After storing the image signal outputted from the CCD 106 in the memory card via the image processing section 107, the system controller 120 changes the OIS unit control section 104 from the shooting image blurring compensation mode to the monitor image blurring compensation mode. It may be configured so that the conditions of the three ways, namely, the above case 1, case 2 and case 3, are changed by a menu button (not shown) mounted to the main body of the imaging device ICD.

Figure 6:
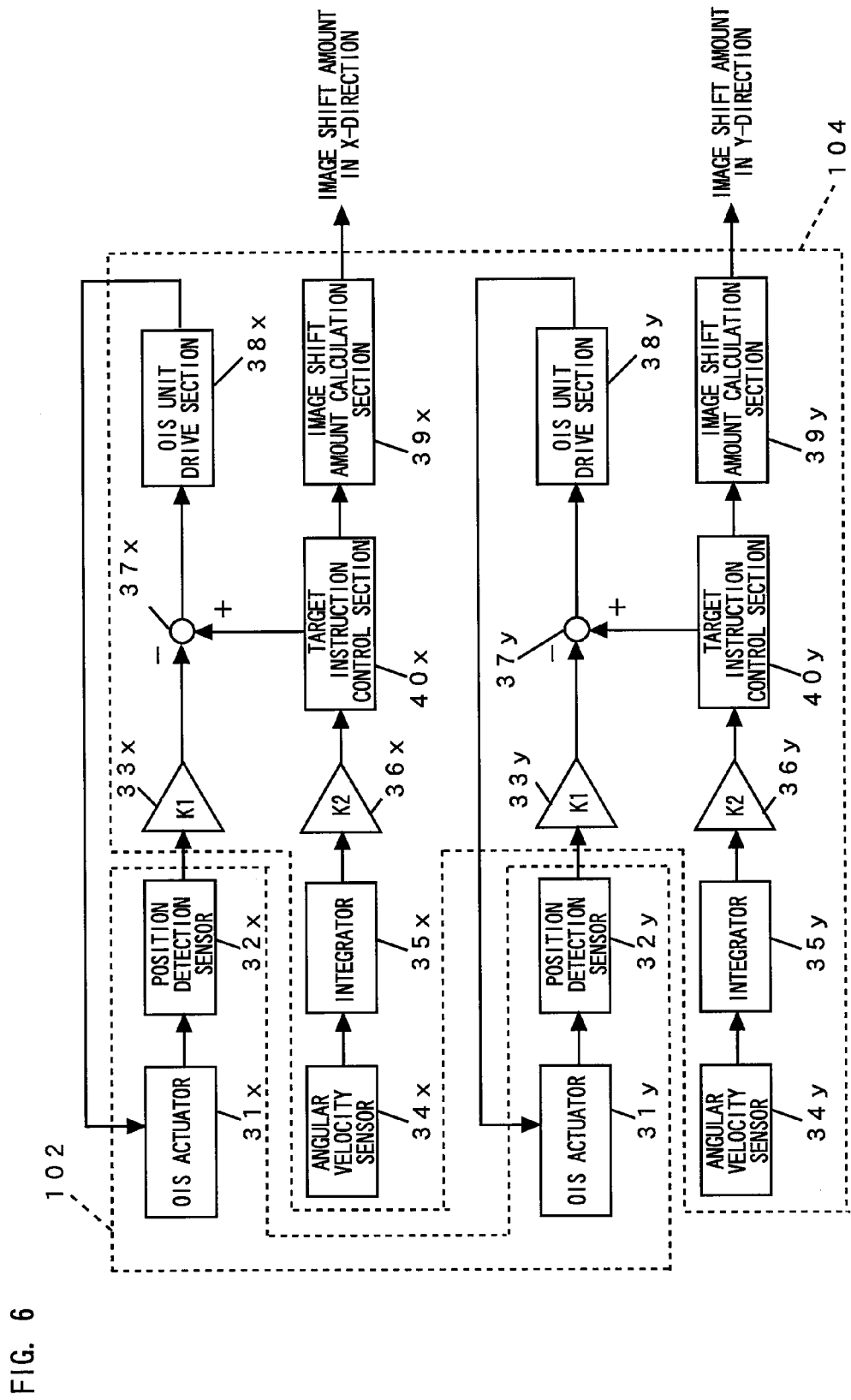
FIG. 6 is a block diagram showing a structure of the OIS unit of the imaging device of FIG. 6.

With reference to FIG. 6, the operation of the OIS unit control section 104 will be described in detail with the above case 1 exemplified. In the description, the framing period indicates a period from a time when the shutter button of the operation section 110 is pressed halfway to a time when the shutter button is pressed fully. Also, the exposure period indicates a period from the time when the shutter button of the operation section 110 is pressed fully through a time when exposure to the image sensor is stated to a time when the exposure is completed.

As shown in FIG. 6, the image blurring compensation function is achieved by the OIS unit 102 and the OIS unit control section 104. The OIS unit 102 includes OIS actuators 31x and 31y, and position detection sensors 32x and 32y. The OIS actuator 31x is composed of the coil pattern 7B which moves in the left-right direction (a yawing direction) together with the image blurring compensation lens 1 (the OIS unit 102), the magnet 10B and the yoke 11B which are fixed to the fixed frame 5. The position detection sensor 32x is realized by the hall element 8B. The position detection sensor 32y is composed of the coil pattern 7A which moves in the up-down direction (a pitching direction) together with the image blurring compensation lens 1 (the OIS unit 102), the magnet 10A and the yoke 11A which are fixed to the fixed frame 5. The position detection sensor 32y is realized by the hall element 8A.

The OIS unit control section 104 includes gain compensation sections 33x and 33y, angular velocity sensors 34x and 34y, integrators 35x and 35y, gain compensation sections 36x and 36y, comparison sections 37x and 37y, OIS unit drive sections 38x and 38y, image shift amount calculation sections 39x and 39y, and target instruction control sections 40x and 40y.

The angular velocity sensor 34x detects an angular velocity in a direction of the OIS actuator 31x which moves the image blurring compensation lens 1 (the OIS unit 102) in the left-right direction (the yawing direction). The integrator 35x integrates angular velocity information outputted from the angular velocity sensor 34x, and outputs angle information. The OIS unit drive section 38x supplies power to the coil pattern 7B. The gain compensation section 33x multiplies position information of the movable portion outputted from the position detection sensor 32x with a predetermined gain K1. The gain compensation section 36x multiplies the angle information outputted from the integrator 35x with a predetermined gain K2.

The target instruction control section 40x outputs, based on image blurring angle information of the main body of the imaging device ICD outputted from the gain compensation section 36x, target instruction information for optically and electronically compensating image blurring. The comparison section 37x compares the position information of the movable portion outputted from the gain compensation section 33x with angle information of the main body of the imaging device ICD outputted from the target instruction control section 40x, and outputs through the OIS unit drive section 38x a control signal for controlling the position of the movable portion which performs the optical image blurring compensation. Further, the image shift amount calculation section 39x calculates, based on the angle information of the main body of the imaging device ICD outputted from the target instruction control section 40x, an image shift amount for performing the electronic image blurring compensation.

Similarly, the angular velocity sensor 34y detects an angular velocity in a direction of the OIS actuator 31y which moves the image blurring compensation lens 1 (the OIS unit 102) in the up-down direction (the pitching direction). The integrator 35y integrates angular velocity information outputted from the angular velocity sensor 34y, and outputs angle information. The OIS unit drive section 38y supplies power to the coil pattern 7A. The gain compensation section 33y multiplies position information of the movable portion outputted from the position detection sensor 32y with the predetermined gain K1. The gain compensation section 36y multiplies the angle information outputted from the integrator 35y with the predetermined gain K2.

The target instruction control section 40y outputs, based on image blurring angle information of the main body of the imaging device ICD outputted from the gain compensation section 36y, target instruction information for optically and electronically compensating image blurring. The comparison section 37y compares the position information of the movable portion outputted from the gain compensation section 33y with angle information of the main body of the imaging device ICD outputted from the target instruction control section 40y, and outputs through the OIS unit drive section 38y a control signal for controlling the position of the movable portion which performs the optical image blurring compensation. Further, the image shift amount calculation section 39y calculates, based on the angle information of the main body of the imaging device ICD outputted form the target instruction control section 40y, an image shift amount for performing the electronic image blurring compensation.

It is noted that in the present embodiment, the target instruction control sections 40x and 40y output target instruction signals to the image shift amount calculation sections 39x and 39y during the framing period, respectively, to perform the electronic image blurring compensation. The target instruction control sections 40x and 40y output target instruction signals to the comparison sections 37x and 37y during the exposure period, respectively, to perform the optical image blurring compensation. The switching between the electronic image blurring compensation and the optical image blurring compensation is performed by an instruction outputted from the system controller 120.

The following will describe operations of the above-mentioned OIS unit 102 and the above-mentioned OIS unit control section 104 in the optical image blurring compensation. A control instruction signal for compensating image blurring due to vibration of the imaging device ICD in the left-right (yawing) direction is outputted from the gain compensation section 36x through the angular velocity sensor 34x and the integrator 35x. In the case where there is no vibration in the left-right direction, a predetermined reference voltage is outputted through the gain compensation section 36x and the target instruction control section 40x. The position of the image blurring compensation lens is controlled by the OIS unit drive section 38x, the OIS actuator 31x, the position detection sensor 32x, and the gain compensation section 33x in accordance with the reference voltage. In other words, in this state, a voltage outputted from the comparison section 37x to the OIS unit drive section 38x becomes nearly zero, and the center of the image blurring compensation lens 1 (the OIS unit 102) corresponds to a vertical line which substantially passes through the center of the imaging optical system other than the image blurring compensation lens 1 (the OIS unit 102).

In the sate where vibration of the imaging device ICD in the left-right (yawing) direction occurs, a voltage corresponding to a rotation angle of the imaging device ICD in the left-right direction is outputted through the gain compensation section 36x and the target instruction control section 40y. Based on the voltage corresponding to the rotation angle in the left-right direction, the image blurring compensation lens 1 (the OIS unit 102) is moved in a direction, in which the image blurring is cancelled, by an amount corresponding to the rotation angle in the left-right direction. Therefore, the gain compensation section 33x and the gain compensation section 36x are adjusted such that power which is required to move the position of the image blurring compensation lens 1 (the OIS unit 102) in the direction in which the image blurring is cancelled is outputted, based on the output having been detected by the position detection sensor 32x, from the OIS unit drive section 38x to the OIS actuator 31x. More specifically, the adjustment is performed at a manufacturing plant of the imaging device ICD before shipment.

On the other hand, a control instruction signal for compensating image blurring due to vibration of the imaging device ICD in the up-down direction (the pitching direction) is outputted from the gain compensation section 36y through the angular velocity sensor 34y and the integrator 35y. In the state where there in no vibration in the up-down direction, a predetermined reference voltage is outputted through the gain compensation section 36y and the target instruction control section 40y. The position of the image blurring compensation lens 1 (the OIS unit 102) is controlled by the OIS unit drive section 38y, the OIS actuator 31y, the position detection sensor 32y, and the gain compensation section 33y in accordance with the reference voltage. In other words, in this state, a voltage outputted from the comparison section 37y to the OIS unit drive section 38y becomes nearly zero, the center of the image blurring compensation lens 1 (the OIS unit 102) corresponds to a horizontal line which substantially passes through the center of the imaging optical system other than the image blurring compensation lens 1 (the OIS unit 102).

In the state where vibration of the imaging device ICD in the up-down direction occurs, a voltage corresponding to a rotation angle of the imaging device ICD in the up-down direction is outputted through the gain compensation section 36$y$ and the target instruction control section 40$y$. Based on the voltage corresponding to the rotation angle in the up-down direction, the image blurring compensation lens 1 (the OIS unit 102) is moved in a direction, in which the image blurring is cancelled, by an amount corresponding to the rotation angle in the up-down direction. Therefore, the gain compensation section 33$y$ and the gain compensation section 36$y$ are adjusted such that power which is required to move the position of the image blurring compensation lens 1 (the OIS unit 102) in the direction in which the image blurring is cancelled is outputted, based on the output having been detected by the position detection sensor 32$y$, from the OIS unit drive section 38$y$ to the OIS actuator 31$y$. More specifically, the adjustment is performed at a manufacturing plant of the imaging device ICD before shipment.

It is noted that the OIS actuator 31$x$, the position detection sensor 32$x$, the gain compensation section 33$x$, the comparison section 37$x$, and the OIS unit drive section 38$x$ constitute a control loop gain, and the OIS actuator 31$y$, the position detection sensor 32$y$, the gain compensation section 33$y$, the comparison section 37$y$, and the OIS unit drive section 38$y$ constitute a control loop gain.

Figure 7:
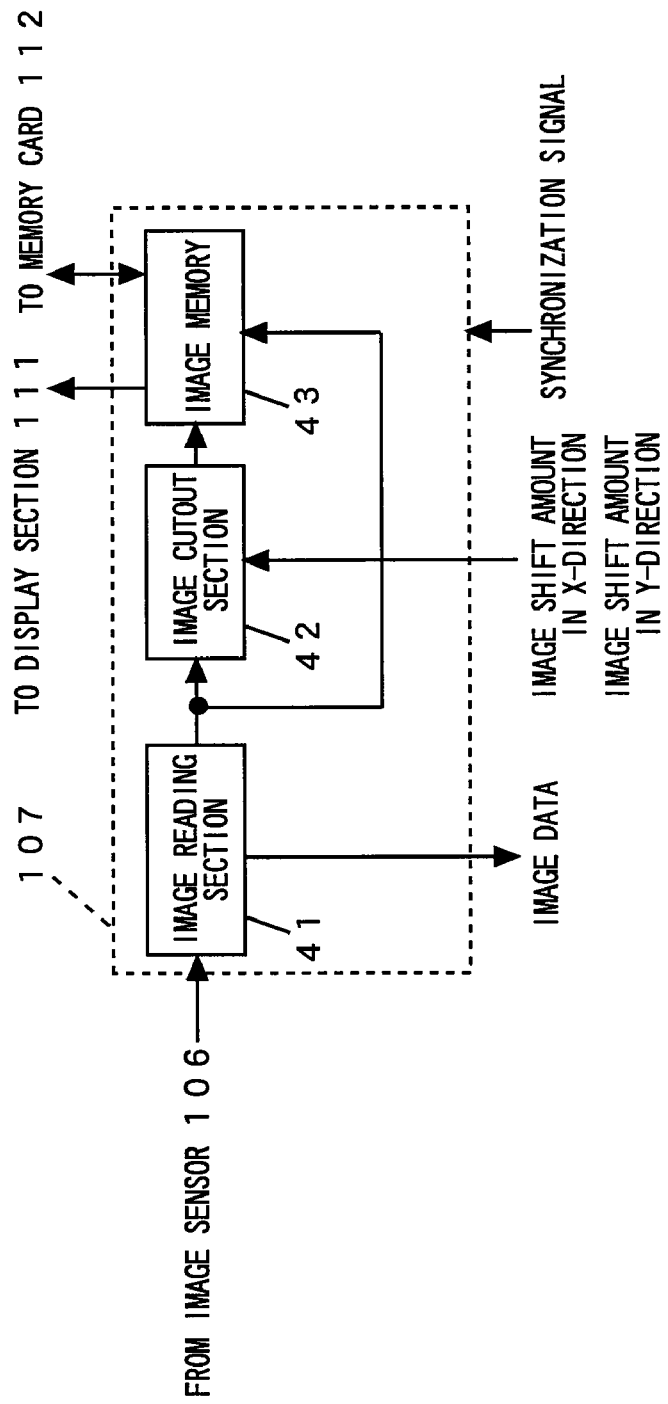
FIG. 7 is a block diagram showing a structure of an image processing section of the imaging device of FIG. 1.

With reference to FIG. 7, the following will describe an operation of the electronic image blurring compensation of the image processing section 107 in the present embodiment. The image processing section 107 includes an image reading section 41, an image cutout section 42, and an image memory 43, and achieves the electronic image blurring compensation function. The image reading section 41 outputs image data to the image cutout section 42 when the image blurring is electronically compensated during the framing period, and outputs the image data to the image memory 43 during the exposure period. The image reading section 41 also reads image data of one frame from the CCD 106, and outputs the image data to the focus information calculation section 109 in order to calculate the contrast information as an evaluation score for driving and focusing the focus lens unit 103.

The image cutout section 42 cuts out the image data obtained from the image reading section 41 such that an amount of the image blurring is compensated in accordance with the image data of one frame and image shift amounts in x-direction and y-direction corresponding to the image data, and outputs the cutout image data to the image memory 43. During the framing period, the image data on the image memory 43 which is updated for each frame is supplied to the display section 111 and is displayed as an image. After end of the exposure, the image data during the exposure period which is outputted from the CCD 106 to the image reading section 41 is supplied to the display section 111 and is displayed as an image, and further stored in the memory card 112. It is noted that each frame indicates, for example, 30 to 120 Hz and is processed at a timing of a outputted from the system controller 120.

Figure 8:
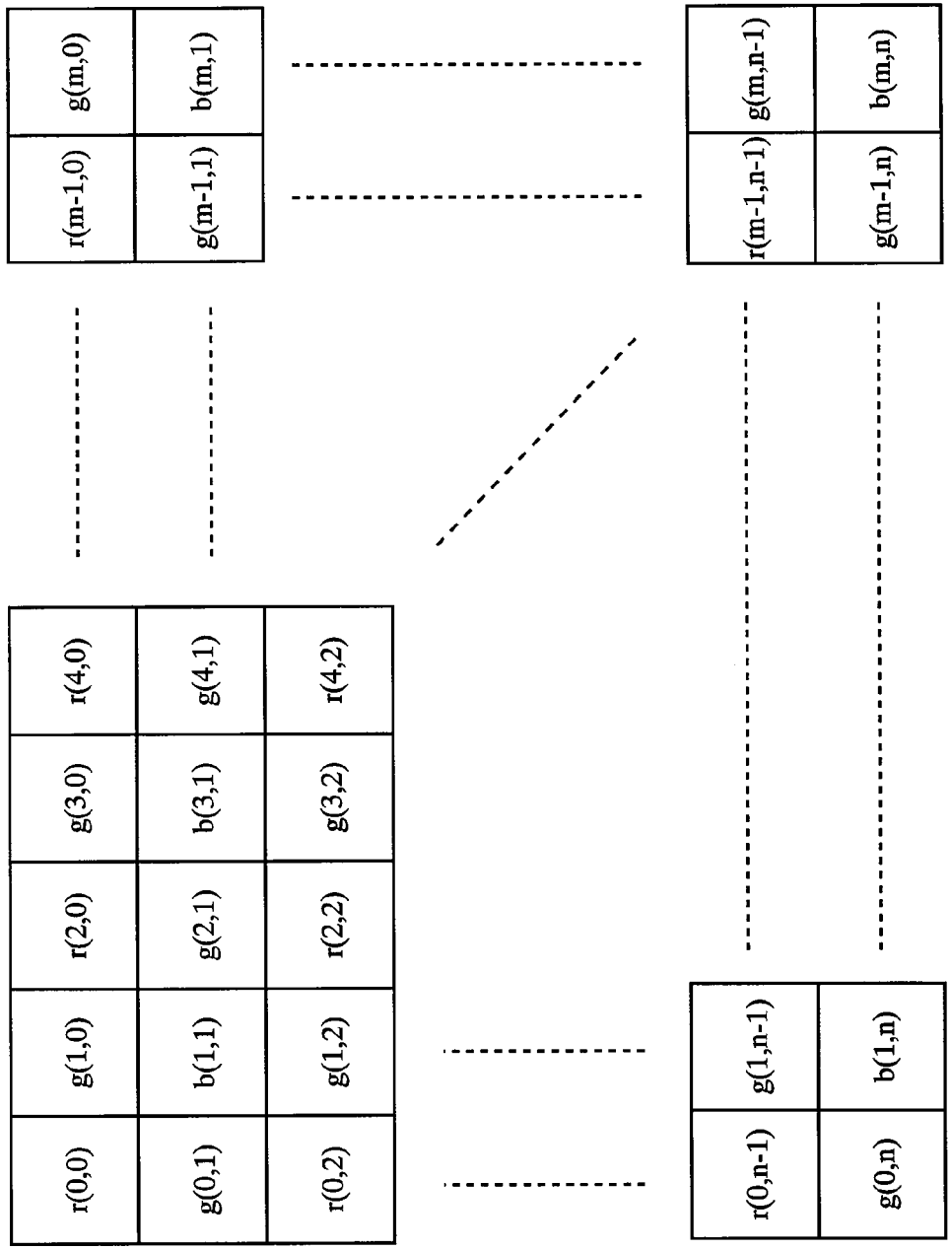
FIG. 8 is a view illustrating an arrangement of image data of the imaging device of FIG. 1.
Figure 9A:
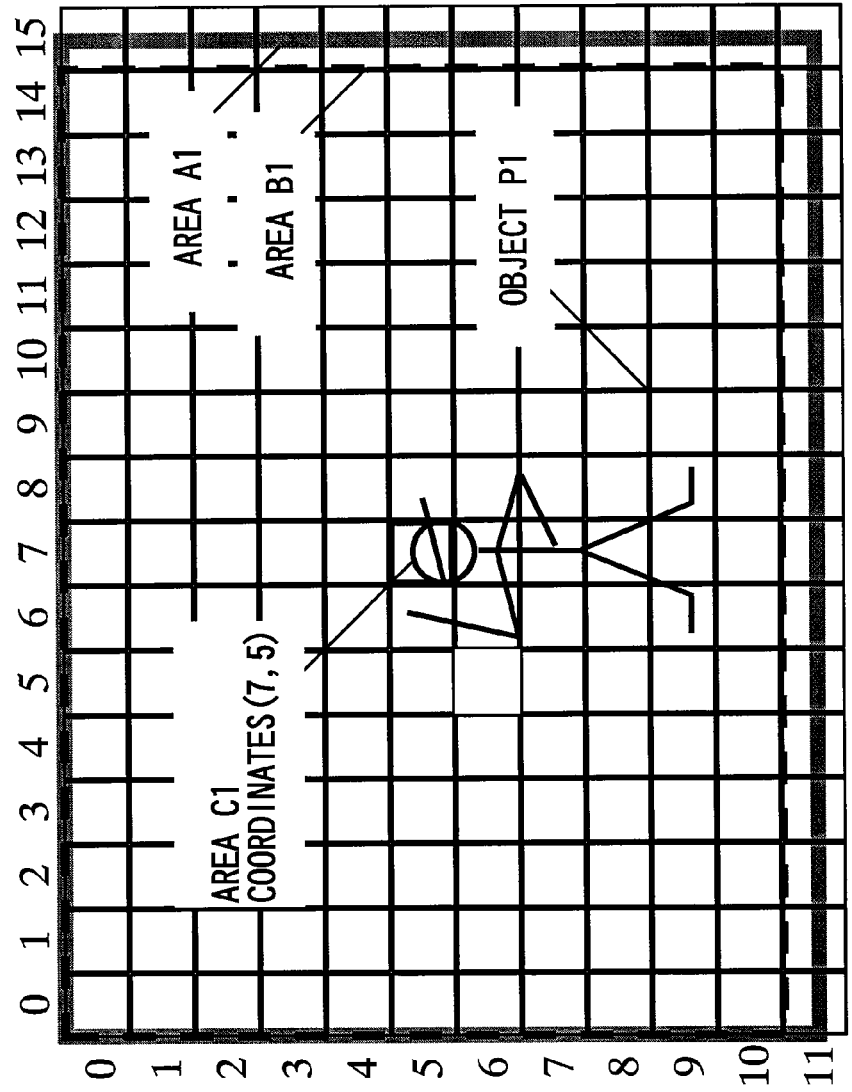
FIG. 9A is a view illustrating an electronic image blurring compensation function of the imaging device of FIG. 1.
Figure 9B:
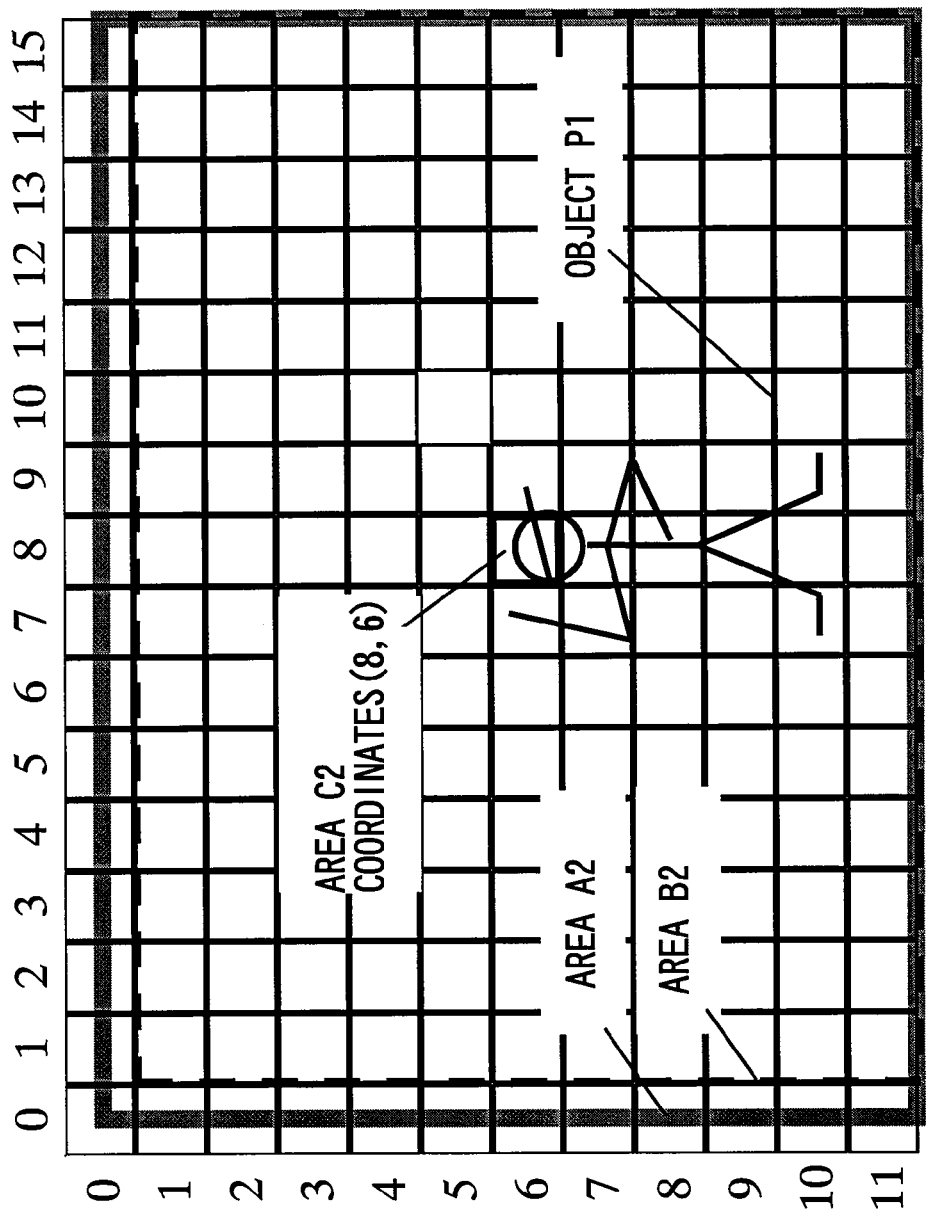
FIG. 9B is a view illustrating the electronic image blurring compensation function of the imaging device of FIG. 1.
Figure 9C:
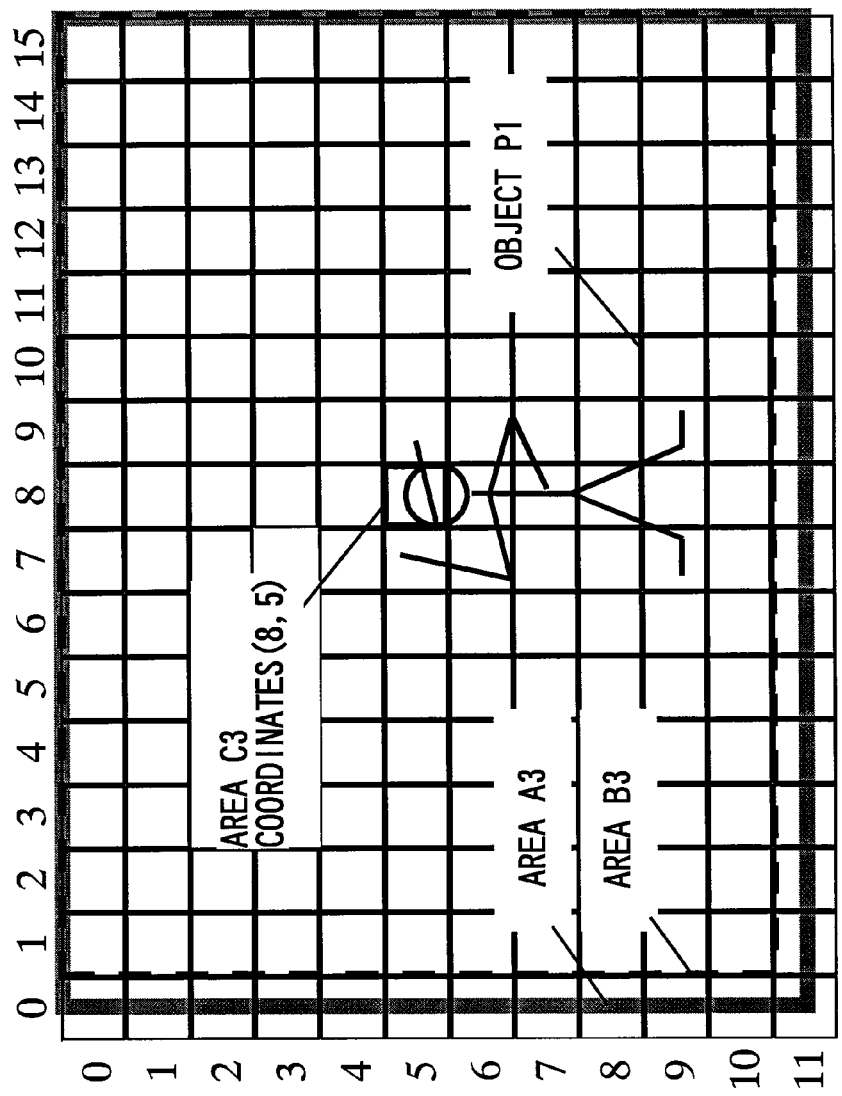
FIG. 9C is a view illustrating the electronic image blurring compensation function of the imaging device of FIG. 1.
Figure 9D:
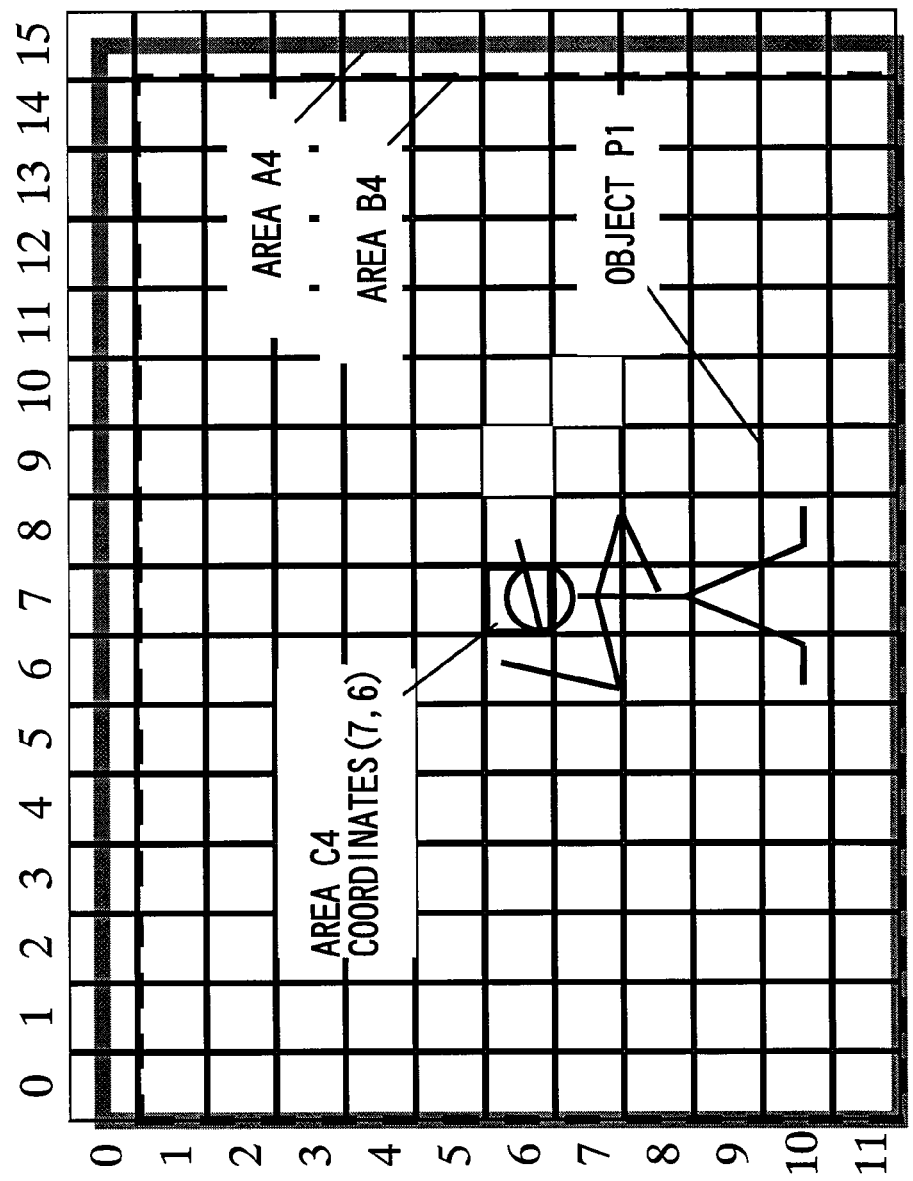
FIG. 9D is a view illustrating the electronic image blurring compensation function of the imaging device of FIG. 1.

With reference to FIG. 8, arrangement of image data will be described. In FIG. 8 shows image data generated by an image sensor such as CCD, and particularly in this example, shows arrangement of the image data read by the image reading section 41 from the CCD 106. In this figure, inside "( )" indicates coordinates of a pixel, and the image data is composed of pixels arranged in m+1 columns (zero to m in order from left) and n+1 rows (zero to n in order from top). For example, m=2559 and n=1919 are given in a CCD of 5 millions pixels, and m=2303 and n=1727 are given in a CCD of 4 millions pixels.

In other words, r(0,0), g(1,0), or b(1,1) indicates one of the (m+1)×(n+1) pixel units. For example, in the case where 1 pixel is represented with 256 gradation sequence, the r(0,0) holds a numeric value representing information of red color with 256 gradation sequence. The g(1,0) holds a numeric value representing information of green color with 256 gradation sequence. The b(1,1) holds a numeric value representing information of blue color with 256 gradation sequence.

With reference to FIGS. 9A to 9D, the electrical image blurring compensation function will be described. In this figure, the sign 17 indicates a QVGA image data frame when the image data shown in FIG. 8 is thinned out to a size of 320 pixels×240 pixels. For the sake of simplicity, as shown in FIGS. 9A to 9D, a coordinate in x direction is represented with a unit 0 to 15, and a coordinate in y direction is represented with a unit 0 to 11. In the case where the size of the image data arrangement frame 17 is QVGA, unit area frames C1 to C4 are each defined as an area consisting of 20 pixels× 20 pixels.

FIG. 9A, FIG. 9B, FIG. 9C, and FIG. 9D show an example of an image of an object P1 taken every 1/30s. In this example, the position of the object P1 in the screen is changed in the order of FIG. 9A, FIG. 9B, FIG. 9C, and FIG. 9D. Namely, the specific position of the object P1 moves in the order of coordinates (7,5) of the area C1, coordinates (8,6) of the area C2, coordinates (8,5) of the area C3, and coordinates (7,6) of the area C4.

Areas A1, A2, A3, and A4 indicate cutout areas of image data for performing the electronic image blurring compensation during the framing period. Areas B1, B2, B3, and B4 indicate cutout areas of image data in the case where they are made to follow image blurring during the framing period.

Next, the differences between the areas A1 to A4 and the areas B1 to B4 will be described. As the electronic image blurring compensation function in the present embodiment, two modes, namely, a monitor image blurring compensation mode and a shooting image blurring compensation mode which will be described bellow are considered.

<Monitor Image Blurring Compensation Mode>

The electronic image blurring compensation in this mode is a function to make compensation so as to follow image blurring of the object P1 as shown by the areas B1 to B4. Where a focal distance is 400 mm in 35 mm film conversion, the value 320, that is, the number of pixels in x direction in the image data arrangement frame corresponds to a field angle of 5.15 degrees.

In the case where the specific position of the object P1 is represented by the areas C1 to C4, it is understood that between the area C1 and the area C2, image blurring of 20 pixels (corresponding to 0.32 degrees) in x direction and 20 pixels (corresponding to 0.32 degrees) in y direction occurs for 1/30s. Angle information of the image blurring which occurs between the area C1 and the area C2 (1/30s) is outputted from the target instruction control section 40, and the image shift amount calculation sections 39$x$ and 39$y$ can calculate image shift amounts in x direction and y direction by multiplying the angle information with 320 pixels/5.15 degrees.

Based on the calculated image shift amounts in x direction and y direction, the area B1 is cut out from the QVGA image data arrangement frame 17 so that the area C1 is located at a center thereof. Hereafter, similarly, the area B2 is cut out so that the area C2 is located at a center thereof, the area B3 is cut out so that the area C3 is located at a center thereof, and the area B4 is cut out so that the area C4 is located at a center thereof. As shown by the areas B1 to B4, image data is cut out from the QVGA image data arrangement frame 17 for each frame and displayed on the display section 111, thereby displaying the object P1 with little image blurring.

<Shooting Image Blurring Compensation Mode>

The electronic image blurring compensation in this mode is a function to make compensation in a state where image blurring of the object P1 is slightly left as shown by the areas A1 to A4. Where a focal distance is 400 mm in 35 mm film conversion, the value 320, that is, the number of pixels in x direction in the image data arrangement frame corresponds to a field angle of 5.15 degrees. In the case where the specific position of the object P1 is represented by the areas C1 to C4, it is understood that between the area C1 and the area C2, image blurring of 20 pixels (corresponding to 0.32 degrees) in x direction and 20 pixels (corresponding to 0.32 degrees) in y direction occurs for 1/30s.

Angle information of the image blurring which occurs between the area C1 and the area C2 (1/30s) is outputted from the target instruction control sections 40x and 40y. In the example of the above monitor image blurring compensation mode, the image shift amount calculation sections 39x and 39y calculate the image shift amounts in x direction and y direction by multiplying the image blurring angle information with 320 pixels/5.15 degrees. However, in the shooting image blurring compensation mode, the image shift amount calculation section 39x and 39y calculate image shift amounts in x direction and y direction by multiplying the image blurring angle information outputted from the target instruction control sections 40x and 40y with 320 pixels/5.15 degrees×(1−0.65).

As a result, in the shooting image blurring compensation mode, when the area A1 is cut out from the QVGA image data arrangement frame 17 based on the calculated image shift amounts in x direction and y direction, the area C1 is located at a position leftward and upward offset from a center of the area A1 for 13 pixels both in x direction and y direction. Hereafter, similarly, the area A2 is cut out so that the area C2 is located at a position rightward and downward offset from a center of the area A2 for 13 pixels both in x direction and y direction, the area A3 is cut out so that the area C3 is located at a position rightward and upward offset from a center of the area A3 for 13 pixels both in x direction and y direction, and the area A4 is cut out so that the area C4 is located at a position leftward and downward offset from a center of the area A4 for 13 pixels both in x direction and y direction. As shown by the area A1 to A4, image data is cut out from the QVGA image data arrangement frame 17 for each frame and displayed on the display section 111, thereby monitoring the object P1 with image blurring left slightly.

Figure 10:
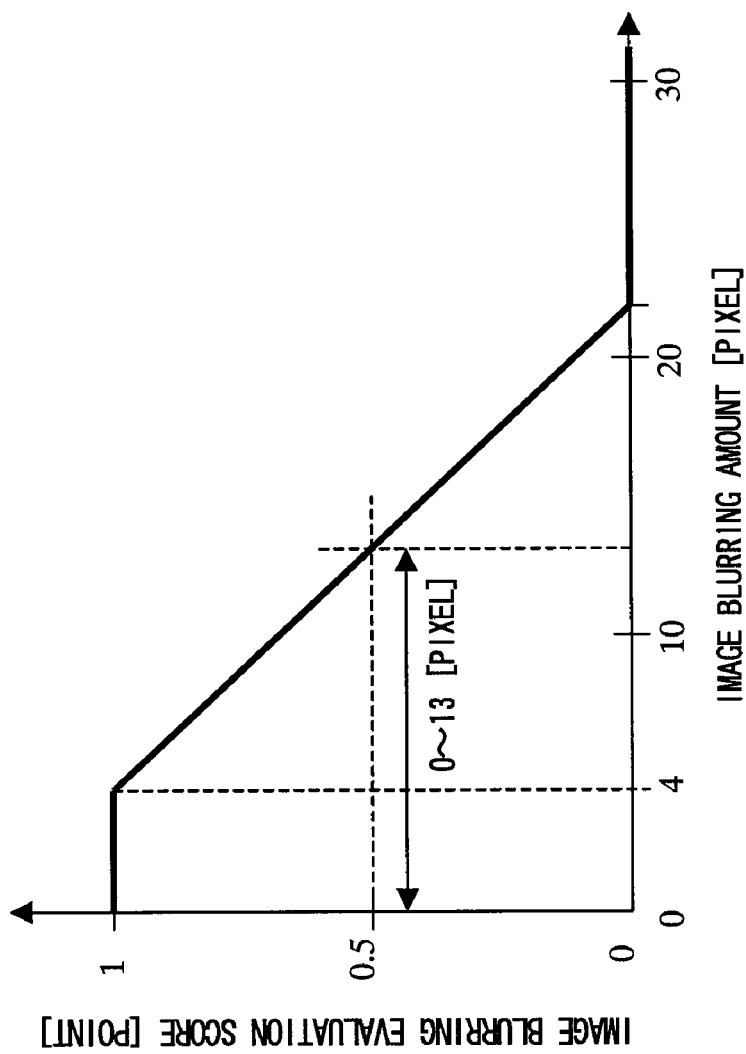
FIG. 10 is a view illustrating a relation between an image blurring amount on a QVGA monitor and an image blurring evaluation score in the present invention.

With reference to FIG. 10, a relation between an image blurring amount and an image blurring score in the OVGA monitor will be described. In this figure, a result of evaluation by ten examinees with respect to position variation of an object in the screen of a 2.5-inch QVGA monitor is shown. More specifically, each examinee gives each monitor screen any one of scores "image blurring is no problem: one point", "cannot decide whether or not: 0.5 point" and "image blurring is problem: zero point". In this figure, the horizontal axis indicates an image blurring amount in x direction and y direction, specifically, a maximum image blurring amount in x direction and y direction when image blurring occurs randomly by a unit of one pixel for each image on the monitor screen which is updated every 1/30s. The vertical direction indicates an average of scores by the examinees.

As seen from FIG. 10, a rate of "image blurring is no problem" is larger than that of "image blurring is problem" when the maximum image blurring amount in x direction and y direction is equal to or smaller than 13 pixels. Almost everybody answers "image blurring is no problem" when the maximum image blurring amount in x direction and y direction is equal to or smaller than 4 pixels. Thus, it is known that only by reducing the image blurring amount in x direction and y direction to 13 pixels or smaller, an object can be relatively clearly displayed on the monitor screen during the framing period.

As described above with reference to FIG. 9, image blurring of 20 pixels in each of x direction and y direction corresponds to 0.32 degrees in converting into an image blurring angle. Thus, in view of the fact that an object can be displayed relatively clearly by reducing image blurring to 13 pixels or smaller, image blurring compensation just have to be performed for an image blurring angle by 1−13/20=1−0.65. As a result, as described above, the areas A1 to A4 which are cut out from the QVGA image data arrangement frame 17 can be larger in dimension than the areas B1 to B4. More specifically, each dimension of the areas A1 to A4 is 95.2% while each dimension of the areas B1 to B4 is 86.4%, so that a change in magnification on the monitor screen can be reduced and an object can be relatively clearly displayed on the monitor screen.

Figure 14:
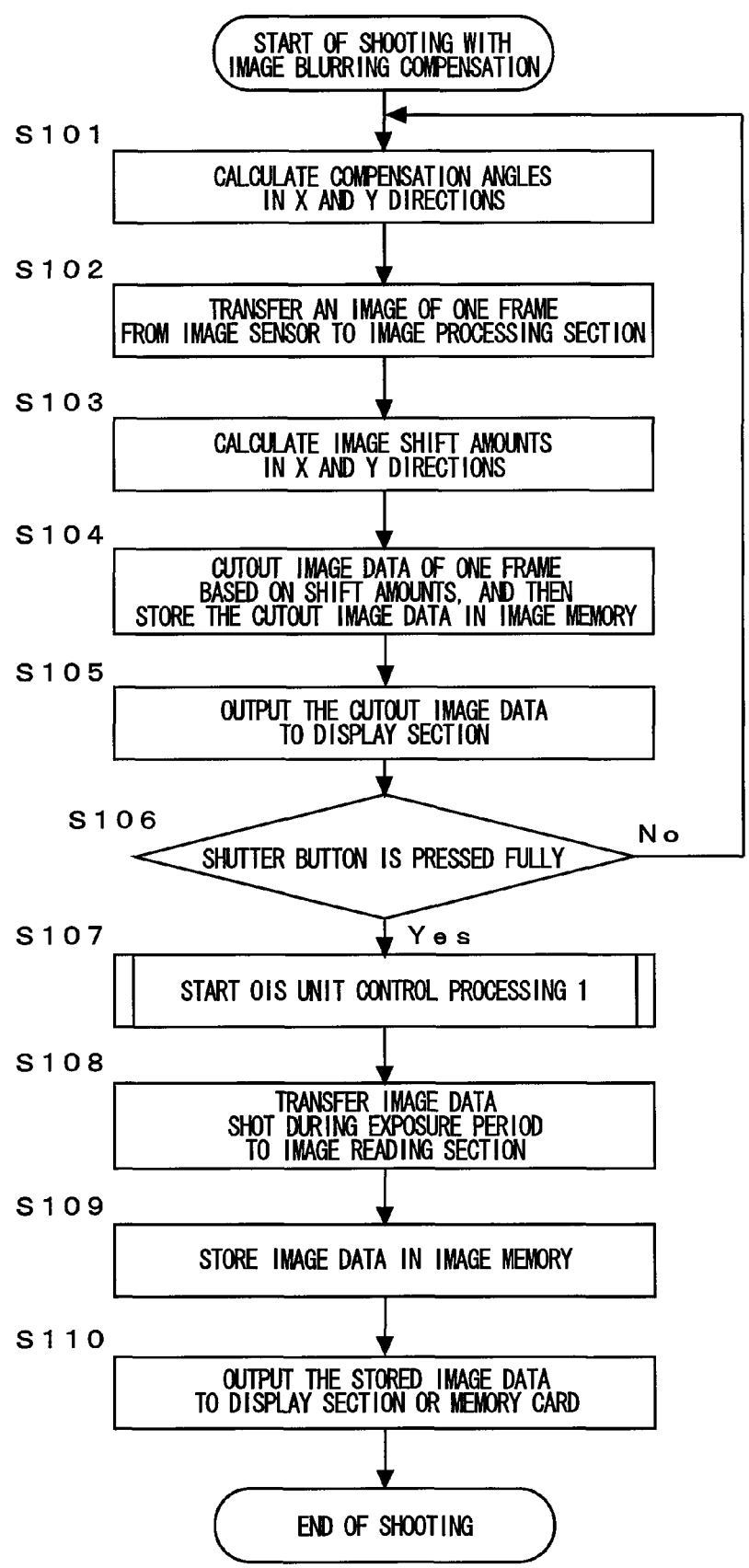
FIG. 14 is a flow chart showing an operation of the image blurring compensation function of the imaging device ICD according to the embodiment 1 of the present invention.

With reference to a flow chart shown in FIG. 14, an operation of the image blurring compensation controlled by the system controller 120 will be described. As described above, the system controller 120 actuates the OIS unit control section 104 at the time of detecting a state of the shutter button being pressed fully. The OIS unit control section 104 controls the target instruction control section 40 so as to output to the comparison sections 37x and 37y the angle information used for controlling movement of the OIS unit 102 based on the image blurring angle. The image shift amount calculation sections 39x and 39y output zero as image shift amounts in x direction and y direction. After causing the CCD 106 to output an image signal and storing the image signal in the memory card through the image processing section 107, the OIS unit control section 104 terminates its operation. A period when the OIS unit control section 104 operates in the above manner is referred to as a shooting image blurring compensation mode or OIS unit control processing 1.

When the shutter button of the operation section 110 is pressed halfway, processing is started from "start of image blurring compensation imaging processing". At step S101, the blurring angle information of the imaging device ICD obtained by integrating the output of the angular velocity sensor is outputted from the target instruction control sections 40x and 40y to the image shift amount calculation sections 39x and 39y. Reference angle information is outputted from the target instruction control sections 40x and 40y to the comparison sections 37x and 37y. Thus, the above control loop of the OIS unit functions, whereby a compensation lens unit is held at a reference position.

At step S102, image data of one frame is outputted from the CCD 106 to the image processing section 107.

At step S103, the image shift amount calculation sections 39x and 39y calculate image shift amounts in x direction and y direction by multiplying information of compensation angles in x direction and y direction outputted from target instruction control sections 40x and 40y with 320 pixels/5.15 degrees×(1−0.65) As described above, when a focal distance is 400 mm in 35 mm film conversion, the value of 320, that is, the number of pixels in x direction in the image data arrangement frame corresponds to a field angle of 5.15 degrees. When image blurring of 20 pixels (corresponding to 0.32 degrees) in x direction and 20 pixels (corresponding to 0.32 degrees) in y direction occurs for 1/30s, 7 pixels is outputted from each of the image shift amount calculation sections 39x and 39y as image shift amounts in x direction and y direction.

At step S104, the above image cutout section 42 cuts out one-frame image data based on the image shift amounts in x direction and y direction. Then, the cutout image data is stored in the image memory 43.

At step S105, the stored image data is read from the image memory 43, and displayed on the display section 111.

At step S106, whether or not the shutter button of the operation section 110 is pressed fully is determined. When the shutter button is not pressed fully, the processing returns to the processing of the step S101. The operations of the above steps S101 to S106 are repeated, and as described with reference to FIG. 9, the monitor image blurring compensation mode during the framing period functions, and an image is displayed with relatively little image blurring. When the shutter button is pressed fully, the processing proceeds to step S107.

At the step S107, the processing changes from the monitor image blurring compensation mode to the shooting image blurring compensation mode, and an operation of the above OIS unit control processing 1 is started. Because the OIS unit 102 is moved and controlled based on the image blurring angle information of the main body of the imaging device ICD, an image in which image blurring is substantially cancelled can be taken. In changing from the monitor image blurring compensation mode to the shooting image blurring compensation mode, the OIS unit starts moving from the reference position. Thus, compensation can be made with a margin for a limit value such as an angle range, and the like which is permitted by specification of a compensation optical system.

At step S108, image data during the exposure period is transferred from the CCD 106 to the image reading section 41.

At step S109, the image data is outputted from the image reading section 41, and stored in the image memory 43.

At step S110, the image data is outputted from the image memory 43 to any of the display section 111 and the memory card 112, the processing changes from the shooting image blurring compensation mode to the monitor image blurring compensation mode, and the imaging processing is terminated.

Figure 12:
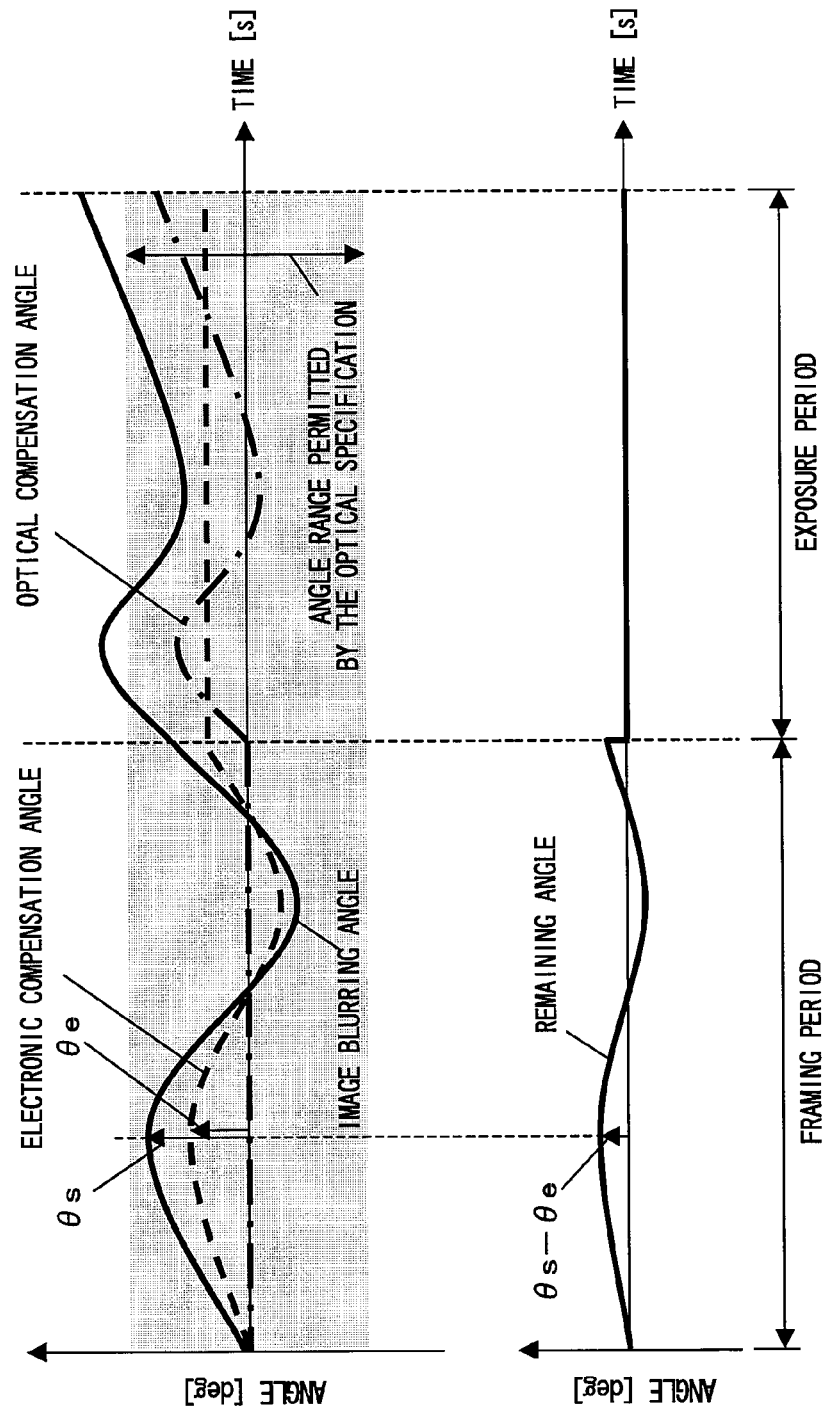
FIG. 12 is a view illustrating a relation between an image blurring angle and a compensation angle during a framing period and during an exposure period in the image blurring compensation function according to the embodiment 1 of the present invention.

With reference to FIG. 12, a relation between an image blurring angle and a compensation angle during the framing period and during the exposure period in the image blurring compensation function will be described. In this figure, the horizontal axis indicates a course of time in the monitor image blurring compensation mode during the framing period and the shooting image blurring compensation mode during the exposure period (an imaging processing period). The vertical axis indicates an angle (an image blurring angle, an electronic compensation angle, and a remaining angle). In other words, a state where the processing changes from the monitor image blurring compensation mode to the shooting image blurring compensation mode is shown.

It is noted that the image blurring angle is a movement angle of the main body of the imaging device ICD, and obtained as angle information by the angular velocity sensors 34x and 34y, the integrators 35x and 35x, and the gain compensation sections 36x and 36y. The electronic compensation angle is an angle corresponding to a cutout position in the QVGA image data arrangement frame 17 during the monitor image blurring compensation mode. The optical compensation angle indicates a compensation angle by a compensation lens when the movement of the OIS unit is controlled based on the blurring angle information during the shooting image blurring compensation mode. The remaining angle is an image blurring amount on the taken image.

During the framing period, as described with reference to FIG. 9 and FIG. 10, the electronic image blurring compensation is performed with a remaining angle of 0.21 degrees where an image blurring angle θs=0.32 degrees and an electronic compensation angle θe=0.11 degrees. The remaining angle 0.21 degrees indicates that image blurring of 13 pixels remains in the QVGA monitor of 320 pixels×240 pixels. During the framing period, even though such image blurring remains, an object can be relatively clearly displayed on the monitor screen as described above.

During the exposure period, the optical image blurring compensation is performed. Since the movement of the OIS unit 102 is controlled so as to follow the image blurring angle, the remaining angle becomes constant. Also, since the blurring compensation lens 1 is moved from the reference position, the blurring compensation lens 1 can move within the optical angle range permitted by the optical specification.

Figure 11:
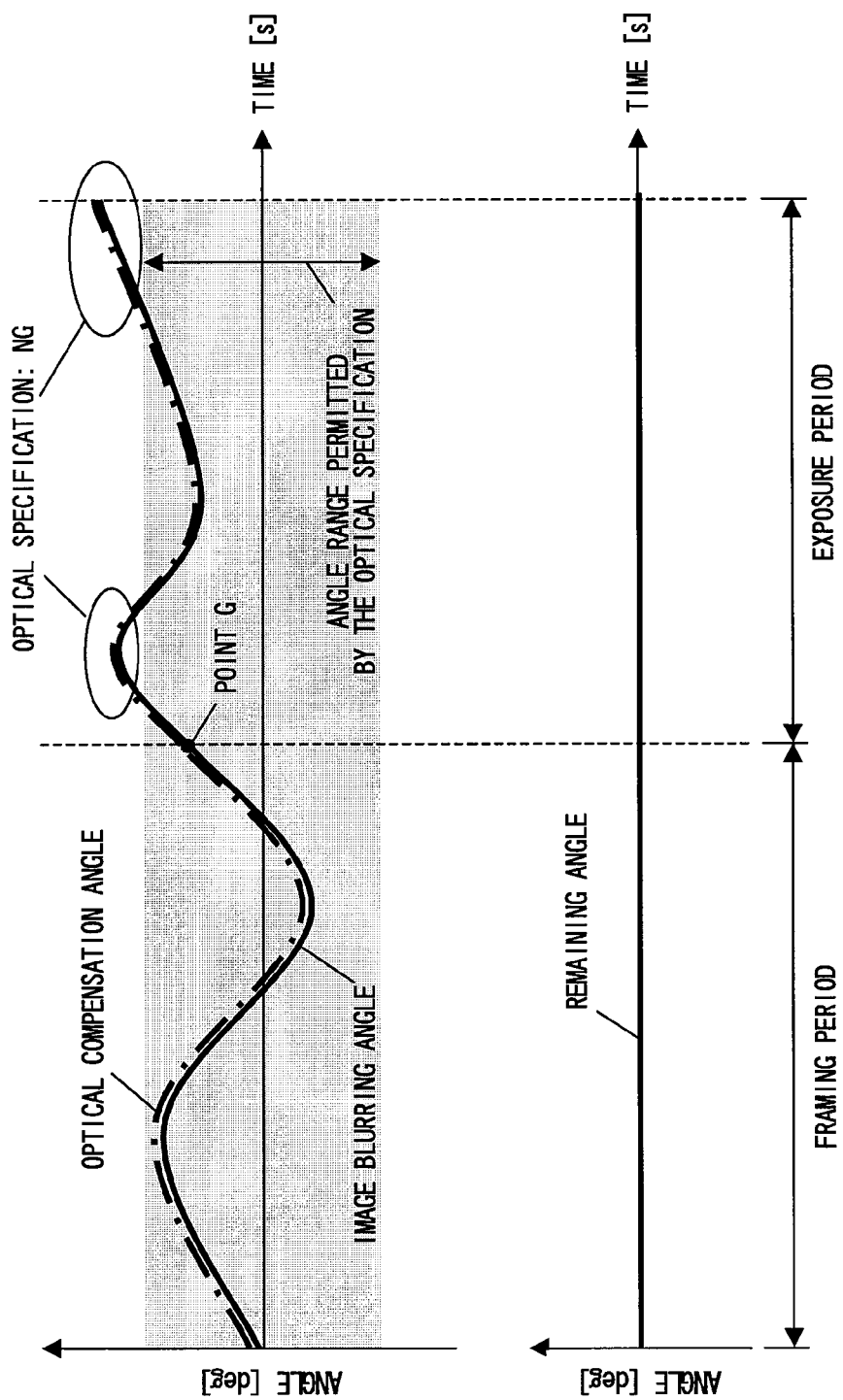
FIG. 11 is a view illustrating a relation between an image blurring angle and an optical compensation angle during a framing period and during an exposure period in a constant compensation mode of a conventional imaging device.

With reference to FIG. 11, a relation between an image blurring angle and an optical compensation angle during a framing period and during an exposure period in a constant compensation mode of a conventional imaging device will be described. In this figure, the horizontal axis indicates a course of time in the framing period and the exposure period. The vertical axis indicates an angle (an image blurring angle, an optical compensation angle, and a remaining angle). The image blurring angle is a movement angle of the main body of the imaging device ICD, and obtained as angle information by an angular velocity sensor, an integrator, and a gain compensation section in the conventional imaging device similarly to the present invention. The optical compensation angle indicates a compensation angle by an image blurring compensation lens when the movement of the OIS unit is controlled based on the blurring angle information. The remaining angle is an image blurring amount of the taken image.

As seen from FIG. 11, in the constant compensation mode of the conventional imaging device, image blurring compensation can be performed so that image blurring does not occur in a monitor screen during the framing period. However, because the image blurring compensation lens is constantly operated, the image blurring compensation lens may be located at point G near the boundary of the angle range permitted by the optical specification at the time when the framing period is switched to the exposure period. In this case, as shown by ellipses, the image blurring compensation lens exceeds the angle range permitted by the optical specification during the exposure period, thereby leading to defect in optical performance.

Embodiment 2

Figure 13:
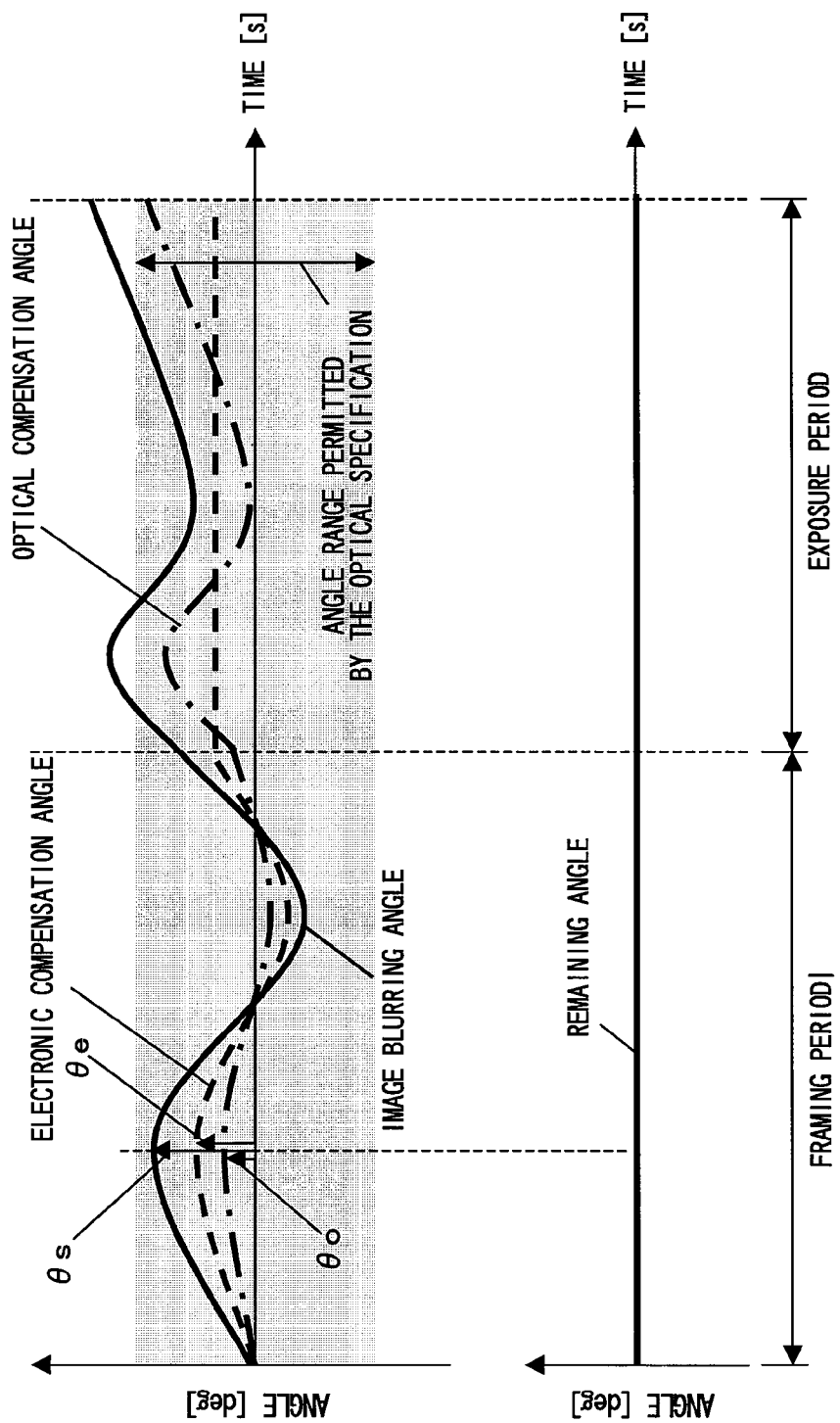
FIG. 13 is a view illustrating a relation between an image blurring angle and a compensation angle during a framing period and during an exposure period in an image blurring compensation function according to an embodiment 2 of the present invention.
Figure 15:
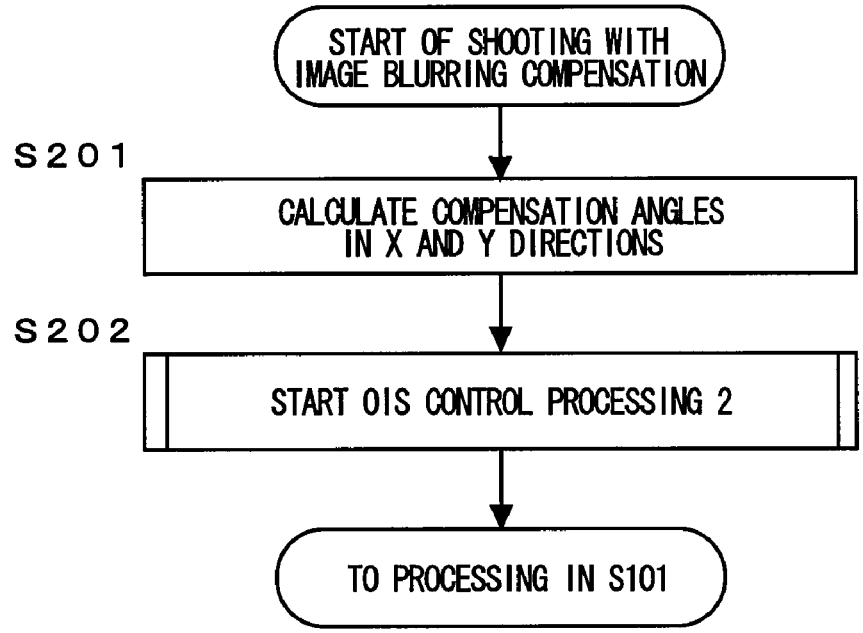
FIG. 15 is a flow chart showing an operation of the image blurring compensation function of the imaging device ICD according to the embodiment 2 of the present invention.

With reference to FIG. 13 and FIG. 15, an imaging device according to an embodiment 2 of the present invention will be described. The imaging device according to the embodiment 2 is constructed similarly to the above imaging device ICD according to the embodiment 1 of the present invention except that a way of controlling the movement of the OIS unit 102 is different. Namely, in the embodiment 1, as described above, in the monitor image blurring compensation mode, image data is cut out from the image data arrangement frame so as to follow image blurring or so as to perform compensation with image blurring slightly left. On the other hand, in the present embodiment, in the monitor image blurring compensation mode, the electronic image blurring compensation is performed by cutting out image data from the image data arrangement frame so that the image blurring is slightly left, and the optical image blurring compensation by controlling the movement of the OIS unit 102 is performed for the image blurring left in the electronic image blurring compensation.

With reference to a flow chart shown in FIG. 15, an operation of the image blurring compensation in the present embodiment will be described. An operation of the OIS unit control section 104 is classified into two types, namely, OIS unit control processing 1 which is operated when the shutter button of the operation section 110 is pressed fully, and OIS unit control processing 2 which is operated when the shutter button of the operation section 110 is pressed halfway.

In a state where the shutter button is pressed halfway, as described later with reference to FIG. 13, target instruction information for performing electronic image blurring compensation is outputted from the target instruction control sections 40x and 40y to the image shift amount calculation sections 39x and 39y. At the same time, target instruction information for performing optical image blurring compensation is outputted to the comparison sections 37x and 37y. For each of x direction and y direction, angle information is generated by adding up the target instruction information for performing electronic image blurring compensation and the target instruction information for performing optical image blurring compensation. The angle information is distributed by target instruction control sections 40x and 40y so as to be equal to angle information which is outputted from the angular velocity sensors 34x and 34y, the integrators 35x and 35y, and the gain compensation sections 36x and 36y. When the OIS unit control section 104 operates based on the distributed target instruction information is referred to as the OIS unit control processing 2.

When the shutter button of the operation section 110 is pressed halfway, processing is started from "start of image blurring compensation imaging processing". In the case where a focal distance is 400 mm in 35 mm film conversion, when image blurring corresponding to 0.32 degrees occurs in x direction and y direction, at step S201, 0.32 degrees, which is blurring angle information of the imaging device ICD and is obtained by integrating the output of the angular velocity sensor, is distributed and outputted from the target instruction control sections 40x and 40y to the comparison sections 37x and 37y, the image shift amount calculation sections 39x and 39y. A moving amount of the image blurring compensation lens 1 (the OIS unit 102), which is required for compensating for an angle of 0.21 degrees, is calculated by multiplying 0.65 with compensation angle information of x direction and y direction which is outputted from the angular velocity sensors 34x and 34y, the integrators 35x and 35y, and the gain compensation sections 36x and 36y, and is outputted to the comparison sections 37x and 37y.

At step S202, the control loop of the OIS unit 102 functions in response to target instruction outputted from the target instruction control section 40x and 40y. As a result, the movement of the compensation lens unit is controlled, and the processing proceeds to the processing of the step S101 shown in FIG. 14.

At the steps S101 to S105 described above, the image shift amount calculation sections 39x and 39y calculates image shift amounts in x direction and y direction by multiplying compensation angle information outputted from the target instruction control sections 40x and 40y with 320 pixels/5.15 degrees×(1−0.65). Based on the calculated shift amounts, image data is cut out. Therefore, a sum of an angle of 0.21 degrees for which compensation is made to the OIS unit 102 and an angle of 0.11 degrees for which compensation is made by cutout of image data is 0.32 degrees. As described above, image blurring on the monitor screen can be cancelled by the electronic image blurring compensation and the optical image blurring compensation.

With reference to FIG. 13, a relation between an image blurring angle and a compensation angle during a framing period and during an exposure period in the image blurring compensation function according to the present embodiment will be described. In this figure, the horizontal axis indicates a course of time in the monitor image blurring compensation mode during the framing period and the shooting image blurring compensation mode during the exposure period (an imaging processing period), and the vertical axis indicates an angle (an image blurring angle, an electronic compensation angle, an optical compensation angle, and a remaining angle). In other words, a state where the processing changes from the monitor image blurring compensation mode to the shooting image blurring compensation mode is shown.

In the present embodiment, the image blurring angle is also a movement angle of the main body of the imaging device, and obtained as angle information by the angular velocity sensors 34x and 34y, the integrators 35x and 35y, and the gain compensation sections 36x and 36y. The electronic compensation angle is an angle corresponding to a cutout position in the QVGA image data arrangement frame 17 during the monitor image blurring compensation mode. The optical compensation angle indicates, in the monitor image blurring compensation mode, a compensation angle by the image blurring compensation lens 1 (the OIS unit 102) when the movement of the OIS unit 102 is controlled based on angle information which is obtained by subtracting an electronic compensation angle from the image blurring angle. In the shooting image blurring compensation mode, the optical compensation angle indicates a compensation angle by the image blurring compensation lens 1 (the OIS unit 102) when the movement of the OIS unit 102 is controlled based on the blurring angle information.

During the framing period, as described with reference to FIG. 9 and FIG. 10, the electronic image blurring compensation is performed with a remaining angle of 0.21 degrees where an image blurring angle θs=0.32 degrees and an electronic compensation angle θe=0.11 degrees. Image blurring is substantially cancelled by the optical image blurring compensation with the remaining angle θo=0.21 degrees. During any of the framing period and the exposure period, the image blurring compensation is performed, so that the remaining angle becomes constant. A range in which the image blurring compensation lens 1 (the OIS unit 102) can move in accordance with the electronic image blurring compensation during the framing period is smaller than that of the embodiment 1. Thus, a margin for the angle range permitted by the optical specification is reduced as compared to the embodiment 1 but ensured as compared to the constant compensation mode of the conventional imaging device.

In the present embodiment as described above, the optical image blurring compensation function is added to the monitor image blurring compensation function according to the embodiment 1. Thus, image blurring of an object on the monitor screen during the framing period is substantially cancelled, and a moving amount of the image blurring compensation lens 1 (the OIS unit 102) for the optical image blurring compensation is reduced by concurrently performing the electronic image blurring compensation. As a result, an imaging device can be provided, which substantially cancels image blurring both during the framing period and during the exposure period with a margin for movement of the image blurring compensation lens 1 (the OIS unit 102) during the exposure period ensured.

Further, the imaging device is configured so that the image blurring compensation is performed during a period when the user performs framing while watching the monitor screen and further high accurate image blurring compensation is performed with a margin for movement of a compensation optical system ensured during the framing period. As a result, the imaging device can be provided, which realizes an image blurring compensation function which achieves image blurring compensation during a framing period and image blurring compensation during releasing.

It is noted that a structure for the electronic image blurring compensation function may be achieved by a circuit, or may be configured by a software which performs processing with a microcomputer, and the like.

In the embodiments, an example is shown, in which the optical image blurring compensation is performed by driving the image blurring compensation lens 1 (the OIS unit 102) perpendicularly to the direction of the optical axis. However, the optical image blurring compensation may be performed by rotating a lens unit and/or an image sensor, or the optical image blurring compensation may be performed by driving an image sensor.

Further, the display section has been described as the liquid crystal display. However, another monitor such as an organic EL monitor, and the like may be used as the display section. The liquid crystal display has been described as the QVGA. However, higher-resolution monitor may be used. In the case of a monitor having M pixels×N pixels, the image blurring amount of the horizontal axis in FIG. 10 may be replaced by M/320 or N/240. Also, the monitor size is not limited to 2.5 inch but may be another size.

Further, the image sensor has been described as the CCD but another image sensor such as CMOS, and the like may be used.

Further, it has been described that the exposure is started by operating the shutter button. However, exposure may be started at a timing which is set with a self-timer to change from the monitor image blurring compensation mode to the shooting image blurring compensation mode.

Further, it has been described that a range of cutout from the image data arrangement frame in the electronic image blurring compensation in the monitor image blurring compensation mode is a range corresponding to 0.35 of an image blurring angle. However, the angle may be selected within a range from 1 to 0.35 as described with reference to FIG. 10.

Further, the imaging device of the present invention is applicable to a camera system. More specifically, the camera system includes a camera body and an interchangeable lens. In addition, the camera body includes at least an image sensor which is typified by the above CCD 106. The interchangeable lens is detachable from the camera body, and configured to be able to communicate with the camera body when mounted to the camera body. The interchangeable lens is configured to include at least optical imaging means and optical image blurring compensation means which correspond to the above imaging optical system ICS and the above OIS unit control section 104, respectively.

INDUSTRIAL APPLICABILITY

The present invention is suitable for an imaging device such as a digital still camera, a digital video camera, and the like, and an imaging system.

The invention claimed is:

1. An imaging device for outputting an electric image signal of an object, the imaging device comprising:
   an imaging optical system for forming an optical image of the object by using a plurality of lens units;
   an image sensor for taking and converting the optical image of the object into an electric image signal;
   an oscillation detection section for detecting movement information of the imaging device;
   an optical image blurring compensation section for compensating image blurring occurring in the optical image by moving an optical axis of the imaging optical system;
   an electronic image blurring compensation section for compensating the image blurring by changing a cutout position of image data outputted from the image sensor;
   an image processing section for displaying and storing the image signal obtained by exposing the image sensor;
   an operation button for starting exposure in response to an instruction by a user; and
   an image blurring control section for operating mainly the electronic image blurring compensation section during a framing period from a time when the operation button is pressed halfway to a time when the operation button is pressed fully, and for operating mainly the optical image blurring compensation section during an exposure period from the time when the operation button is pressed fully to a time when the exposure is completed, in accordance with the movement information outputted from the oscillation detection section.

2. The imaging device according to claim 1, wherein
   an operation of image blurring compensation by the electronic image blurring compensation section is changed to an operation of image blurring compensation by the optical image blurring compensation section according to the instruction by the user to start exposure, and
   where the movement information outputted by the oscillation detection section is an angle S degrees, a compensation angle by the electronic image blurring compensation section is smaller than S.

3. The imaging device according to claim 1, wherein
   an operation of image blurring compensation by both of the optical image blurring compensation section and the electronic image blurring compensation section is changed to an operation of image blurring compensation only by the optical image blurring compensation section according to the instruction by the user to start exposure.

4. The imaging device according to claim 1, wherein
   an operation of image blurring compensation by the electronic image blurring compensation section is changed to an operation of image blurring compensation by the optical image blurring compensation section according to the instruction by the user to start exposure, and
   where the movement information outputted by the oscillation detection section is an angle S degrees, a compensation angle by the optical image blurring compensation section before the exposure is smaller than S, and a compensation angle by the optical image blurring compensation section during the exposure period is substantially equal to S.

5. The imaging device according to claim 1, wherein the optical image blurring compensation section includes any one of an actuator which moves a lens perpendicularly to the optical axis, an actuator which moves the image sensor, and an actuator which moves the imaging optical system and the image sensor, and also includes a position detection sensor which detects a position of the actuator.

6. The imaging device according to claim 1, wherein the image blurring control section controls movement of an image blurring compensation lens based on angle velocity information outputted from an angular velocity sensor.

7. The imaging device according to claim 1, wherein an image blurring amount in x direction and y direction is equal to or smaller than 13 pixels in an image which is displayed on a 2.5-inch QVGA monitor every 1/30 seconds from the image data.

8. The imaging device according to claim 1, wherein
the imaging device is a camera system which includes a camera body and an interchangeable lens which is detachable from the camera body and able to communicate with
the camera body when mounted to the camera body,
the camera body includes at least the image sensor, and
the interchangeable lens includes at least the imaging optical system and the optical image blurring compensation section.

9. The imaging device according to claim 1, further comprising a displace section, wherein
an image blurring amount BL (inch) in an image which is displayed on the display section every 1/30 seconds satisfies following expression, $$BL \leq 2.5 \times (4/5) \times (13/320) = 0.08125.$$

* * * * *